(12) United States Patent
Nakayama

(10) Patent No.: US 8,086,384 B2
(45) Date of Patent: Dec. 27, 2011

(54) STOP DETERMINATION APPARATUS, INCLINATION DETERMINATION APPARATUS, AND ELECTRIC PARKING BRAKE CONTROLLER

(75) Inventor: Daisuke Nakayama, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 1109 days.

(21) Appl. No.: 11/649,296

(22) Filed: Jan. 4, 2007

(65) Prior Publication Data

US 2007/0173984 A1 Jul. 26, 2007

(30) Foreign Application Priority Data

Jan. 6, 2006 (JP) ................... 2006-001667
Feb. 28, 2006 (JP) ................... 2006-051635
Oct. 6, 2006 (JP) ................... 2006-274991

(51) Int. Cl.
*G06F 19/00* (2006.01)
*B60T 8/60* (2006.01)

(52) U.S. Cl. ............ 701/79; 303/20; 303/155; 188/2 D; 188/162

(58) Field of Classification Search .............. 701/36, 701/70, 38, 96, 93, 79; 280/5.505; 303/155, 303/20; 188/2 R, 162, 2 D
See application file for complete search history.

(56) References Cited

U.S. PATENT DOCUMENTS

| | | | | |
|---|---|---|---|---|
| 5,408,411 A | * | 4/1995 | Nakamura et al. | 701/48 |
| 6,067,488 A | * | 5/2000 | Tano | 701/35 |
| 6,253,602 B1 | * | 7/2001 | Uchida | 73/115.08 |
| 7,121,633 B2 | * | 10/2006 | Tachiiri et al. | 303/20 |
| 7,140,697 B2 | * | 11/2006 | Koga et al. | 303/20 |
| 2001/0044359 A1 | * | 11/2001 | Saito et al. | 477/92 |
| 2002/0100647 A1 | * | 8/2002 | Miyakawa et al. | 188/162 |
| 2003/0033073 A1 | * | 2/2003 | Kichima et al. | 701/96 |
| 2004/0113489 A1 | * | 6/2004 | Iwagawa et al. | 303/155 |
| 2005/0216164 A1 | | 9/2005 | Sakata | |
| 2005/0246081 A1 | * | 11/2005 | Bonnet et al. | 701/38 |

FOREIGN PATENT DOCUMENTS

| | | |
|---|---|---|
| DE | 198 10 213 | 3/1998 |
| DE | 199 41 482 | 9/1999 |
| DE | 199 54 807 | 11/1999 |

(Continued)

OTHER PUBLICATIONS

European Search Report dated May 15, 2007.

*Primary Examiner* — Ronnie Mancho
(74) *Attorney, Agent, or Firm* — McGinn IP Law Group, PLLC

(57) ABSTRACT

A vehicle stop determination apparatus includes a vehicle speed sensor for detecting a speed of a vehicle, a G sensor for detecting a longitudinal acceleration of a vehicle, an inclination acceleration estimate section for calculating an estimated inclination acceleration resulting from an inclination of a road surface based on a vehicle speed reduction rate calculated from an output of the vehicle speed sensor and an output from the G sensor, and a stop determination section which has a first stop determination mode and a second stop determination mode and which selects the first stop determination mode or the second stop determination mode based on the vehicle speed reduction rate provided before the output of the vehicle speed sensor becomes equal to or less than a detection limit. Also, the inclination is re-determined based on the output of the G sensor when the vehicle is stopped.

13 Claims, 16 Drawing Sheets

FOREIGN PATENT DOCUMENTS

| | | |
|---|---|---|
| EP | 1 327 553 | 7/2003 |
| EP | 1 352 798 | 10/2003 |
| JP | 7-69102 (A) | 3/1995 |
| JP | 2004-142517 | 5/2004 |
| JP | 2005-271822 (A) | 10/2005 |
| WO | 03/040652 | 5/2003 |

* cited by examiner

STOP DETERMINATION APPARATUS, INCLINATION DETERMINATION APPARATUS, AND ELECTRIC PARKING BRAKE CONTROLLER

BACKGROUND OF THE INVENTION

1. Field of the Invention

The present invention relates to a stop determination apparatus for determining whether a vehicle such as an automobile is at a standstill, an inclination determination apparatus for determining an inclination of the road surface on which the vehicle such as an automobile is stopped, and an electric parking brake controller which incorporates both these apparatuses.

The present application claims each priority from Japanese Patent Application Nos. 2006-001667, 2006-051635, and 2006-274991, the respective disclosures of which are incorporated herein by reference.

2. Description of the Related Art

An electric parking brake actuates a parking brake during vehicle parking or stopping using, for example, an electric actuator such as a motor. Such an electric parking brake can be operated by a vehicle operator using electrical switches, thus allowing reduced operator efforts when compared to a manual lever or foot brake pedal.

It has also been suggested that the electric parking brake be provided with an additional hill-hold (hill-holder) function. The hill-hold function serves to automatically actuate the electric parking brake when the vehicle is stopped on an inclined road surface, in order to prevent unintentional movement of the vehicle. To fully realize such a hill-hold function, a reliable determination must be made as to whether the vehicle is at a standstill.

Vehicles are known which are provided with a vehicle speed sensor for detecting the rotational speed of the drive wheels and which utilize its output for determination of a stop of the vehicle. However, such a vehicle speed sensor cannot accurately detect the speed of the vehicle running at an extremely low speed immediately before the vehicle is being stopping. For example, it may be impossible to detect when the vehicle is running at an actual speed of about 2 km/h or less. In this regard, one type of conventionally known electric parking brakes is configured so that a timer is activated when the vehicle speed sensor detects a speed of 2 km/h or less immediately before the vehicle is stopped. Then, the vehicle is determined to be at a standstill after a predetermined period of time has elapsed, and the brakes are applied (for example, see Japanese Patent Application Laid-Open Publication No. 2004-142517).

However, with this conventional technique, the determination of a stop of the vehicle is made only on the basis of this elapsed period of time after the vehicle speed cannot be detected. This may readily allow a difference between the time at which the vehicle is actually brought to a standstill and the time at which the vehicle is determined to be at a stop. The difference would in turn sometimes result in the electric parking brake being activated even when the vehicle has not yet actually stopped. Conversely, the difference would also sometimes allow the vehicle to start to roll onward after the vehicle has been stopped due to a time lag between the stop thereof and the activation of the electric parking brake. This time lag might, for example, be up to about 2 seconds, and thus needs to be improved.

Furthermore, using this conventional technique, it is difficult to accurately estimate the timing of a stop. If any acceleration of the vehicle unexpectedly occurs after the vehicle is determined to have stopped, a G sensor (acceleration sensor), which is normally used to determine the inclination of a road surface, would detect this acceleration and incorporate it into an erroneous determination of the inclination of the road surface.

Furthermore, different braking forces are required for the hill-hold function depending on the inclination (slope) of a road surface on which the vehicle is stopped. For example, on a steep hill, a larger braking force is required to prevent unintentional movement of the vehicle. However, producing such a larger braking force every time would cause an increased burden on the device under normal conditions of use as well as an increase in the power required for activation. In regard to this, an electric parking brake is also known which is provided with an inclination sensor for detecting the inclination of a road surface with an acceleration (G) sensor, to change the braking force in response to the output therefrom (for example, see aforementioned Japanese Patent Application Laid-Open Publication No. 2004-142517).

However, during deceleration of the vehicle or immediately after a stop of the vehicle, the inclination sensor using the G sensor will detect a deceleration G or a longitudinal G caused by pitching of the vehicle or the like, and thus cannot properly determine the inclination. Thus, this will cause a time lag of, for example, about 2 seconds after the vehicle has stopped before the determination of the inclination can be completed. This in turn will cause a time lag between the stop of the vehicle and the activation of the electric parking brake. Thus, for example, after the vehicle has been stopped on an inclined road, the user must keep the brake pedal depressed for a period of time corresponding to this time lag. Thus, further improvement in operability is desired.

SUMMARY OF THE INVENTION

The present invention was developed to overcome these problems. It is therefore an object of the present invention to provide a stop determination apparatus which is capable of making a proper determination of a stop of a vehicle, an inclination determination apparatus which is capable of making a quick determination of the inclination when the vehicle is stopped, and an electric parking brake controller which includes these apparatuses.

The present invention achieves the aforementioned object by the following solutions.

A first aspect of the present invention relates to a vehicle stop determination apparatus for determining whether a vehicle is at a standstill, which includes: a vehicle speed sensor for detecting a speed of a vehicle; a G sensor for detecting a longitudinal acceleration of the vehicle; an inclination acceleration estimate section for calculating an estimated inclination acceleration resulting from an inclination of a road surface based on a vehicle speed reduction rate calculated from an output of the vehicle speed sensor and an output from the G sensor; and a stop determination section which has a first stop determination mode and a second stop determination mode and which selects the first stop determination mode or the second stop determination mode based on the vehicle speed reduction rate calculated before the output of the vehicle speed sensor falls below a detection limit. Then, in the first stop determination mode, a stop of the vehicle is determined based on a change in the output of the G sensor when the output of the vehicle speed sensor is equal to or less than the detection limit, and in the second stop determination mode, the output of the G sensor and the estimated inclination acceleration are compared to each other to determine a stop of the vehicle.

In addition to the first aspect of the present invention, in the first stop determination mode, the determination of a stop may be made based on a change in the output of the G sensor from a decelerating side to an accelerating side. Alternatively, the determination of a stop may be made according to a convergence in variations in the output of the G sensor. Furthermore, in the first stop determination mode, the determination of a stop may be established when variations in the output of the G sensor are equal to or less than a pre-defined threshold value over a predetermined period of time.

Furthermore, the vehicle stop determination apparatus may include an estimated stop time computation section for calculating an estimated stop time based on the detection limit and the vehicle speed reduction rate when the output of the vehicle speed sensor is equal to or less than the detection limit. The stop determination section may further have a third stop determination mode in which a stop of the vehicle is determined after the estimated stop time elapses. Furthermore, the stop determination section may further have a fourth stop determination mode in which a stop of the vehicle is automatically determined regardless of the stop determination determined by the first step determination mode and the second step determination mode when the output of the vehicle speed sensor is equal to or less than the detection limit over a predetermined stand-by time period.

Furthermore, an electric parking brake controller having the vehicle stop determination apparatus according to the first aspect of the present invention includes an electric parking brake control section for controlling an electric actuator to change braking force of a parking brake and thereby switching the electric actuator between a braking state and a released state of the parking brake. When the vehicle stop determination apparatus establishes a determination of a stop of the vehicle, the electric parking brake control section allows the parking brake to transition into the braking state.

A second aspect of the present invention relates to an inclination determination apparatus for determining an inclination of a road surface on which a vehicle is stopped, the inclination determination apparatus including: a vehicle speed sensor for detecting a speed of a vehicle; a G sensor for detecting a longitudinal acceleration of the vehicle; an inclination determination section for calculating an estimated inclination acceleration resulting from an inclination of a road surface based on a vehicle speed reduction rate calculated from an output of the vehicle speed sensor and an output from the G sensor; and a stop determination section for determining a stop of the vehicle based on the output of the vehicle speed sensor. The inclination determination section determines the inclination to be a flat surface if the estimated inclination acceleration is below a predetermined criterion value, and re-determines the inclination based on the output of the G sensor when the stop determination section establishes a determination of a stop of the vehicle.

A third aspect of the present invention relates to an electric parking brake controller including the inclination determination apparatus according to the second aspect of the present invention and an electric parking brake control section for controlling an electric actuator to change braking force of a parking brake. When the stop determination section establishes a determination of a stop of the vehicle, the electric parking brake control section sets the braking force of the parking brake based on an estimated inclination acceleration calculated by the inclination determination section.

The present invention can provide the following effects.

(1) During deceleration, the vehicle is in a state in which the front suspension is compressively (contractively) stroked (nosedived), whereas when the vehicle stops, the front suspension is expansively stroked due to its repulsive force. Since this will result in a change in behavior in the direction of pitching, a stop of the vehicle can be determined based on such a change in behavior in the direction of pitching. This makes it possible to accurately determine the stop of the vehicle even when the vehicle is at an extremely low speed equal to or less than the speed detection limit of the vehicle speed sensor.

(2) A determination of a stop of a vehicle can be made with further improved accuracy by using an estimated stop time calculated based on a deceleration of the vehicle in addition to the change in behavior of the vehicle in the direction of pitching of the vehicle.

(3) Depending on the deceleration of the vehicle, a stop of the vehicle can be determined based on a comparison between an estimated inclination acceleration and an actual acceleration instead of a change in behavior of the vehicle in the direction of pitching of the vehicle. This makes it possible to accurately determine the stop of the vehicle even during a gradual brake application in which a noticeable nosedive is unlikely to occur on the vehicle.

(4) The behavior of the vehicle in the direction of pitching of the vehicle can be detected based on a change (or a reversal) in longitudinal acceleration from a deceleration side to an acceleration side. This eliminates the need for an additional sensor if the vehicle includes a longitudinal G sensor, thereby simplifying the overall arrangement.

(5) When the speed of the vehicle is equal to or less than the speed detection limit of the vehicle speed sensor over a predetermined stand-by time, a stop of the vehicle can be determined irrespective of other parameters. This allows a determination of a stop even when part of the arrangement has failed, thereby providing an improved fail-safe property.

(6) The determination of a stop can be made according to a convergence of variations in the output of the G sensor caused by the behavior of the vehicle in the direction of pitching of the vehicle. Since such pitching occurs while the vehicle is stopped and then diminishes in a short period of time, it is possible to ensure that the determination of a stop is made very soon after the actual stop.

(7) The determination of a stop can be established when variations in the output of the G sensor are equal to or less than a threshold value over a predetermined period of time, thereby allowing the use of a simple logic to make a proper determination of a stop.

(8) Using the result of the aforementioned determination of a stop, the electric actuator is activated to drive the parking brake. This arrangement will prevent erroneous activation before the vehicle is stopped or any increase in time lag between the stop of the vehicle and a brake application, thereby allowing the electric parking brake to be properly activated.

(9) After variations in the output of the G sensor have converged, the target braking force of the parking brake is set based on the output of the G sensor. This eliminates the effects of vehicle pitching, thereby allowing for accurately detecting the inclination of a road surface so as to properly set the braking force.

(10) When the inclination determination is made with the vehicle at a stop, the inclination determination is made based only on the output of the G sensor, thereby allowing for ensuring the accuracy of the determination made during the stop.

(11) When a flat surface determination is made through a comparison between a reduction rate of the vehicle speed and an output of the G sensor, an inclination determination is made again based only on the output of the G sensor. This makes it possible to reduce the possibility of erroneous determinations and thus provide an improved fail-safe property.

BRIEF DESCRIPTION OF THE DRAWINGS

These and other objects and advantages of the present invention will become clearly understood from the following description with reference to the accompanying drawings, wherein.

DETAILED DESCRIPTION OF THE PREFERRED EMBODIMENTS

The present invention solves a challenge of accurately determining a stop of a vehicle. To this end, a stop of a vehicle is determined according to a longitudinal G of the vehicle being reversed from a deceleration side to an acceleration side, the longitudinal G being detected by a G sensor for detecting a longitudinal acceleration of the vehicle after the vehicle speed detected by a vehicle speed sensor has become zero. Additionally, an inclination estimate G is calculated based on the G sensor output and the reduction rate of the vehicle speed, and the resulting value is compared with the G sensor output. Furthermore, variations in the output of the G sensor are monitored to make a determination of a stop when variations in the output caused by pitching while the vehicle is stopped are equal to or less than a threshold value over a predetermined period of time.

First Embodiment

A description will now be made of an electric parking brake system in accordance with a first embodiment of the present invention.

Figure 1:
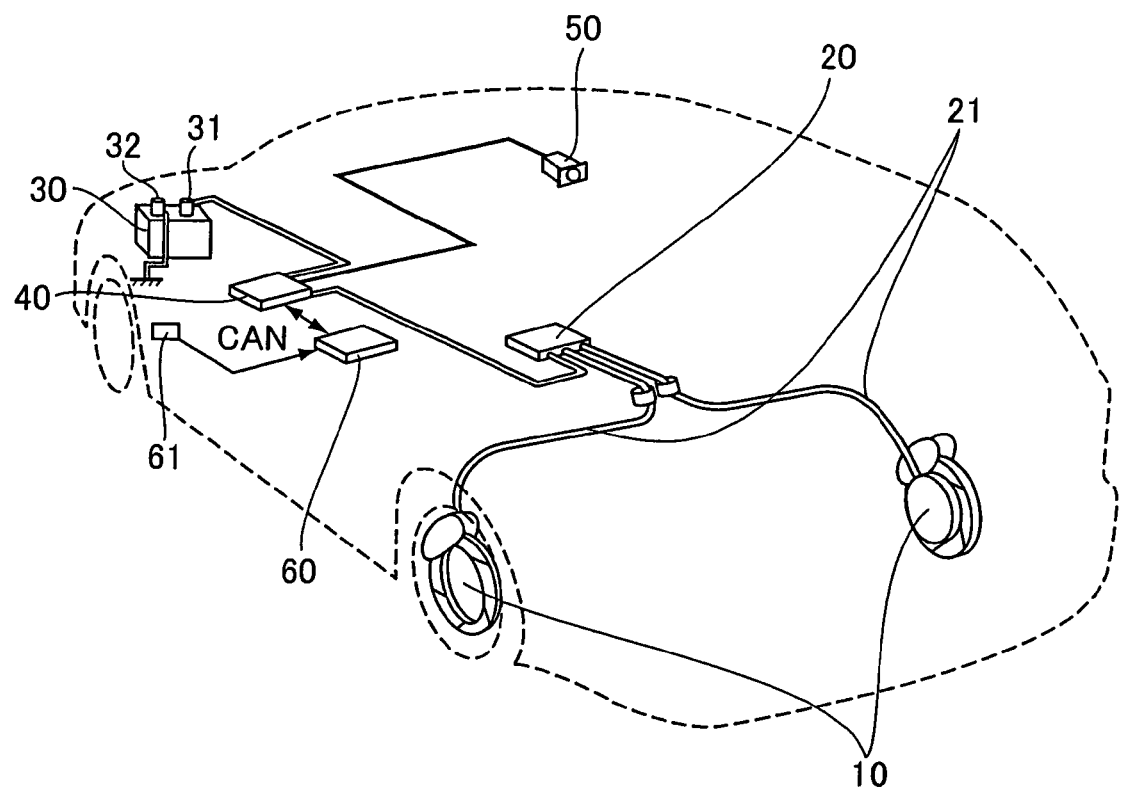
FIG. 1 is a view illustrating the mechanical configuration of an electric parking brake system in accordance with an embodiment of the present invention.
Figure 2:
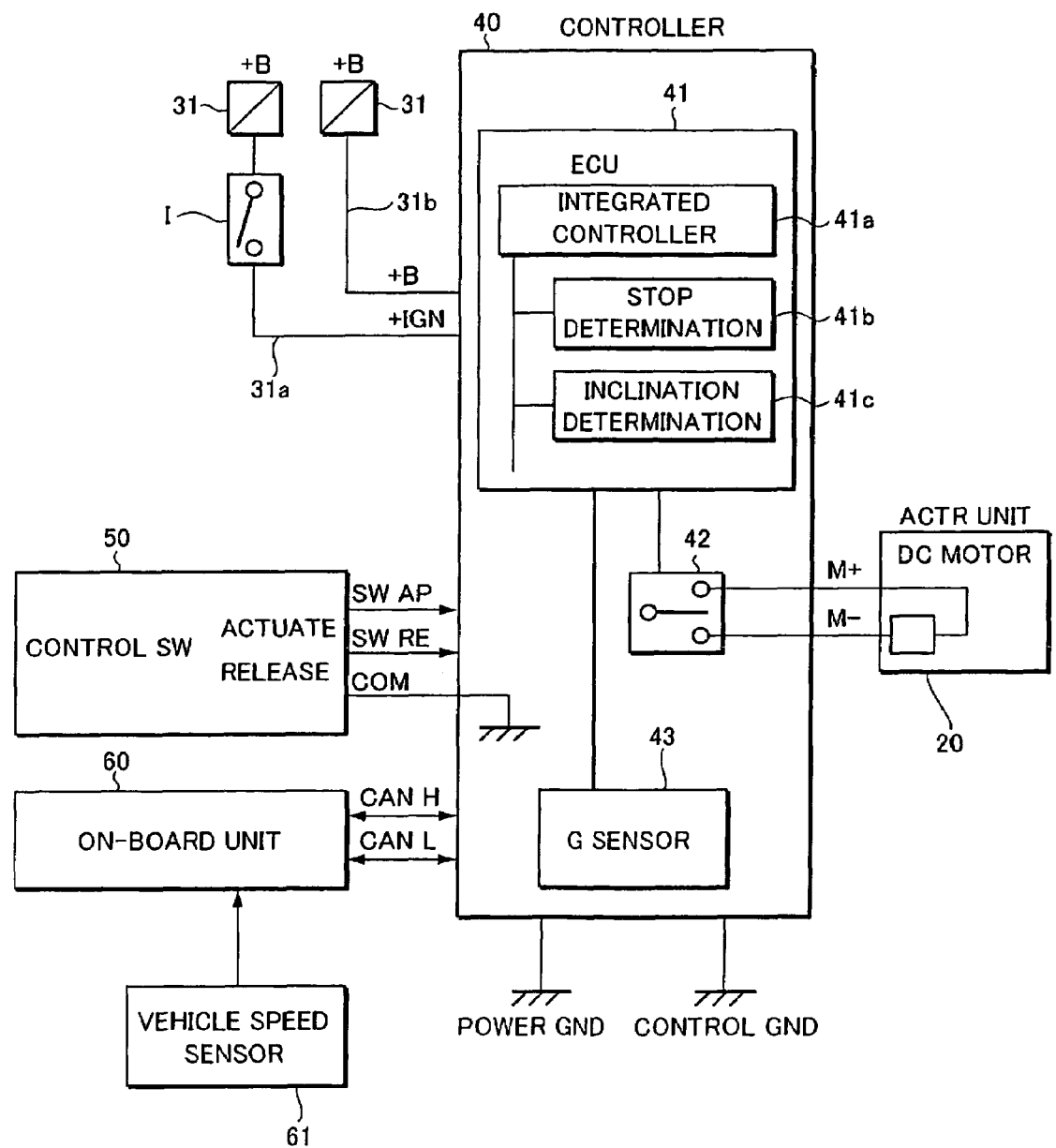
FIG. 2 is a block diagram illustrating the circuit configuration of the electric parking brake system of FIG. 1.

FIG. 1 is a view illustrating the mechanical configuration of an electric parking brake system of this embodiment. FIG. 2 is a block diagram illustrating the circuit configuration of the electric parking brake system.

The electric parking brake system includes a parking brake 10, an actuator unit 20, a battery 30, a controller 40, a control switch 50, and an on-board unit 60.

The parking brake 10 is a braking mechanism for applying brakes to the drive wheels of the vehicle in order to prevent unintentional movement of the vehicle, for example, when the vehicle is parked or at a stop. The brake 10 is installed at each wheel hub portion of the right and left rear wheels of the vehicle. The parking brake 10 is of a type known as a drum-in-disk brake which includes a brake drum (not shown) disposed on the inner diameter side of the rotor of a disk brake used as the foot brake (main brake), and a brake shoe (not shown) to be pushed under pressure against the inner diameter side of the brake drum during a brake application.

The actuator unit 20 drives the shoe of the parking brake 10 to provide transitions between the braking state in which the parking brake 10 produces braking force and the released state in which substantially no braking force is produced. The actuator unit 20 includes a parking brake cable 21 and is secured, for example, to the floor panel portion of the vehicle.

The actuator unit 20 reduces, for example, the rotational force of a direct current (DC) motor through a reduction gear train to rotate the lead screw, allowing an equalizer screwed to the lead screw to pull or release the parking brake cable 21.

The parking brake cable 21, which is disposed on each of the corresponding right and left parking brakes 10, is flexible enough to deform in accordance with the stroke of a rear suspension (not shown). The parking brake cable 21 is pulled to drive the parking brake 10 into the braking state and is released to allow the parking brake 10 to move back to the released state.

Here, the actuator unit 20 serves to adjust the braking force of the parking brake 10 in a braking state by adjusting the pulling force acting on the parking brake cable 21. This adjustment of the pulling force is made by changing the stroke by which the actuator unit 20 pulls the parking brake cable 21. To this end, the actuator unit 20 is provided with a stroke sensor (not shown) for detecting the stroke.

The battery 30, or a rechargeable battery used as a main power source for the electrical system of the vehicle, produces a terminal voltage of, for example 12 VDC. The battery 30 has a plus terminal 31 and a minus terminal 32.

The plus terminal 31 is connected through wires (a harness) to each electrical component such as the controller 40. Power is supplied from the plus terminal 31 to the controller 40 through an ignition conductor 31a and a normally connected conductor 31b, which are arranged as shown in FIG. 2. The ignition conductor 31a has an ignition relay I which is inserted at an intermediate portion thereof to be operatively opened or closed by switching an ignition switch ON or OFF. The ignition relay I is conductive when the engine or the running power source of the vehicle is turned ON. On the other hand, the normally connected conductor 31b, which is conductive all the time irrespective of a manipulation of the ignition switch, is used to retain various types of data in an ECU 41 of the controller 40 or the like.

The minus terminal 32 is grounded to the vehicle body.

The controller 40 is an electric parking brake controller which controls the actuator unit 20 to change the pulling force of the parking brake cable 21, thereby changing the braking force of the parking brake 10. The controller 40 includes the ECU 41, a relay 42, and a G sensor 43.

The ECU 41 includes a CPU which in response to an input from the control switch 50 and the on-board unit 60, determines whether the parking brake 10 is required to apply brakes. The CPU also provides additional pull control for increasing braking force when the vehicle is stopped on a declining or inclining road. The ECU 41 includes an integrated controller 41a, a stop determination section 41b, and an inclination determination section 41c.

The integrated controller 41a collectively controls the stop determination section 41b, the inclination determination section 41c, and the like.

The stop determination section 41b performs vehicle stop determination processing, discussed later, and also serves as a stop time computation section for calculating an estimated stop time used in the process and as an inclination acceleration estimate section for calculating an inclination estimate G.

The inclination determination section 41c performs well-known inclination determination processing whereby the output of the G sensor 43 is processed to determine the inclination of a road surface on which the vehicle is stopped. In the vehicle stop determination processing, the inclination determination section 41c also detects a change in behavior of the vehicle in the direction of pitching based on the output of the G sensor 43.

In response to the control signal delivered by the ECU 41, the relay 42 supplies electric power to the actuator unit 20 to drive it. The relay 42 serves to reverse the polarity of the drive power in order to provide a transition for the parking brake 10 from a braking state to a released state and a transition from a released state to a braking state. The relay 42 is neutral and thus in no electrical communication with the actuator unit 20 other than during driving of the actuator unit 20.

The G sensor 43 detects acceleration of the vehicle in the longitudinal direction, and supplies the resulting output to the ECU 41. The G sensor 43 serves also as a behavior detection section for detecting a change in behavior of the vehicle in the direction of pitching of the vehicle in cooperation with the inclination determination section 41c of the ECU 41 during the determination of a stop of the vehicle. Note that the polarity of the acceleration in the longitudinal direction of the vehicle is herein denoted as positive for the deceleration side and negative for the acceleration side for the purposes of the following explanation.

The control switch 50 is a control section on which a user such as the vehicle operator manually selects the braking state or the released state of the parking brake 10 or inputs additional pull control. For example, the control switch 50 includes a push button switch which is installed on an instrument panel (not shown) of the vehicle. The control switch 50 transmits its input to the controller 40, and in response to it, the controller 40 supplies electric drive power to the actuator unit 20 to drive the parking brake 10.

The on-board unit 60 includes, for example, an engine control unit for controlling the engine of the vehicle; a transmission control unit for controlling the transmission (gearbox); a VDC control unit for providing VDC control including ABS control; and a vehicle integration unit for collectively controlling the other electrical components of the vehicle. The on-board unit 60 communicates with the controller 40 via a CAN communication system or a type of an on-board LAN, and includes a vehicle speed sensor 61.

The vehicle speed sensor 61, which is attached, for example, at a wheel hub portion, is used to detect the running speed of the vehicle (vehicle body speed) by delivering a vehicle speed pulse signal associated with the rotational speed of a tone wheel that rotates together with the drive wheel. Here, the vehicle speed sensor 61 has a lower speed detection limit of, for example, about 2 km/h, and at speeds above this, delivers a vehicle speed pulse signal associated with the vehicle speed.

The on-board unit 60 and the vehicle speed sensor 61 constitute the vehicle stop determination apparatus and the electric parking brake controller, to which the present invention is applied, in cooperation with the controller 40.

The on-board unit 60 sequentially provides information such as the engine rpm, the accelerator opening, the shift position of the transmission, the operating condition of the foot brake, the speed of the vehicle (vehicle speed) and the like to the controller 40. In an automatic operating mode, when the controller 40 has determined that the vehicle has transitioned from a standstill state to a running state based on these inputs, it allows the parking brake 10 to transition from a braking state to a released state.

On the other hand, when the controller 40 has determined that the vehicle has transitioned from a running state to a standstill state (the determination of a stop), it judges that the parking brake 10 should be applied, and accordingly supplies electric drive power to the actuator unit 20 for the parking brake 10 to transition from a released state to a braking state.

A description will now be made of a stop determination method for the electric parking brake system according to the first embodiment. The electric parking brake system according to the first embodiment employs a stop determination method which follows different logics during a normal deceleration (with high G) and during a gradual deceleration (with low G) that is less in deceleration than the normal deceleration.

When having detected that the vehicle has started to decelerate according to a decrease in the vehicle speed detected by the on-board unit 60 using the vehicle speed sensor 61, the ECU 41 of the controller 40 compares the reduction rate (deceleration) of the vehicle speed with a predetermined threshold value. Then, the ECU 41 determines whether the deceleration is a normal, comparatively large, deceleration or a gradual deceleration that is less in deceleration than the normal deceleration (a deceleration state determination step). Then, if the normal deceleration has been detected, the electric parking brake system employs a high-G stop determination method to determine a stop of the vehicle. If the gradual deceleration has been detected, then the electric parking brake system employs a low-G stop determination method to determine a stop of the vehicle.

A description will now be made of each stop determination method.

<<High-G Stop Determination Method (First Mode)>>

Figure 3:
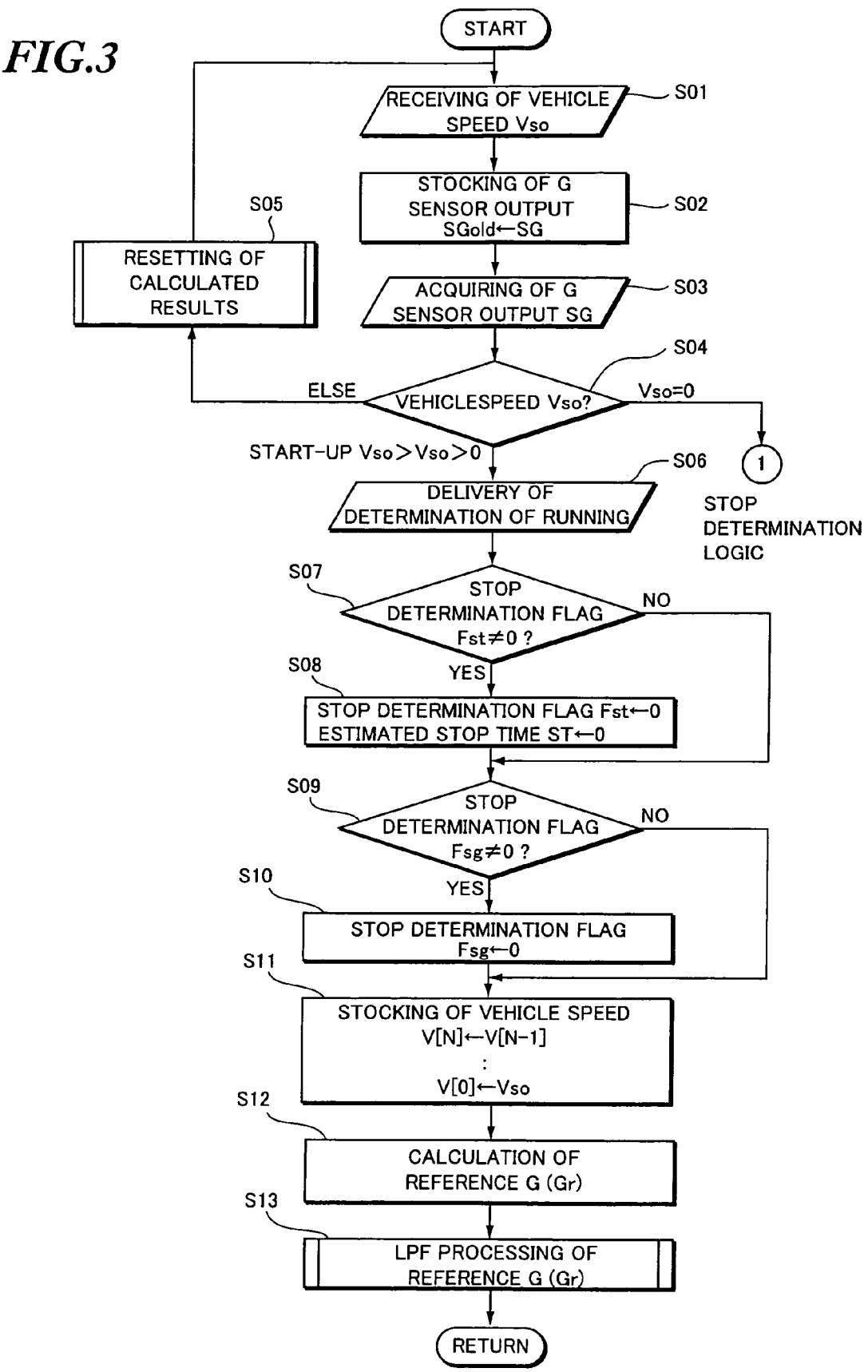
FIG. 3 is a first view of a flowchart showing a high-G stop determination method in the electric parking brake system of FIG. 1.
Figure 4:
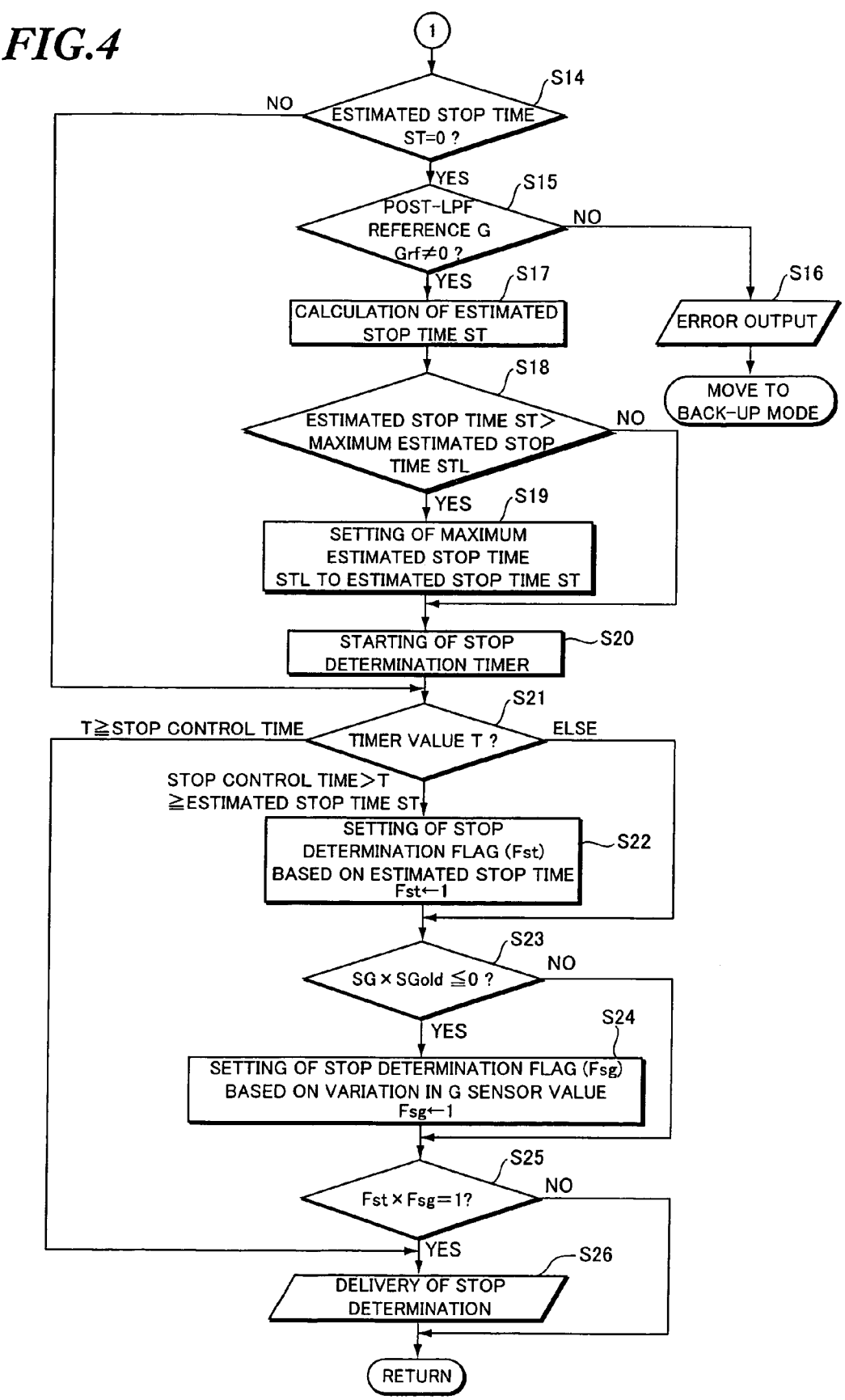
FIG. 4 is a second view of a flowchart showing a high-G stop determination method in the electric parking brake system of FIG. 1.

FIGS. 3 and 4 are a first view (main routine) and a second view (stop determination logic subroutine) of a flowchart showing a high-G vehicle stop determination method in the electric parking brake system of this embodiment.

The steps of the operation will be described below in the order in which they appear.

<Main Routine>
<Step S01: Receiving Vehicle Body Speed Vso>

The ECU 41 of the controller 40 receives a vehicle body speed (vehicle speed) Vso or a running speed of the vehicle detected by the on-board unit 60 using the vehicle speed sensor 61, and then proceeds to Step S02.

<Step S02: Stocking of G Sensor Output>

The ECU 41 stocks the output SG of the G sensor 43 (sen_g) so as to update the previous G sensor output SG with the current G sensor output SG, and then proceeds to Step S03.

<Step S03: Acquiring of G Sensor Output SG>

The ECU 41 acquires a new output SG from the G sensor 43, and then proceeds to Step S04. Here, the sign of the output SG of the G sensor 43 is d to be positive on the deceleration side and negative on the acceleration side.

<Step S04: Determination of Vehicle Body Speed Vso (Vehicle Speed Detection Step)>

The ECU 41 compares the current vehicle body speed Vso with Vso at the time of start of the process (start-up Vso). If the current vehicle body speed Vso is less than the start-up Vso and greater than 0, the ECU 41 proceeds to Step S06. If the current vehicle body speed Vso is equal to 0, the ECU 41 proceeds to Step S14 to initiate processing of the subsequent stop determination logic subroutine (FIG. 4). Otherwise, the ECU 41 proceeds to Step S05.

<Step S05: Resetting of Calculated Results>

The ECU 41 deletes all the internally calculated results in the aforementioned Steps from S01 to S04 inclusive, resets each parameter such as SGold, V[0, . . . , N], Fst, Fsg, Gr, Grf, and T, and then returns to Step S01 to repeat the subsequent process.

<Step S06: Delivery of a Determination of Running>

The ECU 41 outputs a determination of running to indicate that the vehicle is running, and then proceeds to Step S07.

<Step S07: Determination of Stop Determination Flag Fst Based on Stop Determination Time>

The ECU 41 determines whether a stop determination flag Fst is equal to 0, the flag Fst being an indicator of whether or not a stop determination condition has been satisfied based on a stop determination time (stop time) ST, discussed later. If it is not equal to 0, the ECU 41 proceeds to Step S08. If it is equal to 0, the ECU 41 proceeds to Step S09.

<Step S08: Resetting Stop Determination Flag Fst and Estimated Stop Time ST>

The ECU 41 resets the stop determination flag Fst and the estimated stop time ST to 0, respectively, and then proceeds to Step S09.

<Step S09: Determination of Stop Determination Flag Fsg Based on G>

The ECU 41 determines whether a stop determination flag Fsg is equal to 0, the flag Fsg being an indicator of whether the stop determination condition has been satisfied based on the G sensor output SG. If it is not equal to 0, the ECU 41 proceeds to Step S10. If it is equal to 0, the ECU 41 proceeds to Step S11.

<Step S10: Resetting Stop Determination Flag Fsg Based on G>

The ECU 41 resets the stop G flag Fsg to 0, and then proceeds to Step S11.

<Step S11: Stocking of Vehicle Body Speed V>

The ECU 41 updates stored time-series vehicle body speed data V[N] (N is an integer) with V[N−1], respectively, and stocks the current vehicle body speed Vso as V[0], then proceeding to Step S12.

<Step S12: Calculating Reference G (Gr)>

The ECU 41 calculates a reference G (Gr) as expressed by Equation 1 below, a reduction rate of the vehicle speed obtained by calculation based on the output of the vehicle speed sensor 61, and then proceeds to Step S13:

$$Gr(m/s^2) = (V[N](km/h) - V[0](km/h))/(T \times N) \times 1000/3600 \quad \text{(Eq. 1)}$$

where T is the reception interval (in seconds) of the vehicle body speed Vso.

<Step S13: LPF Processing of Reference G>

The ECU 41 performs predetermined low pass filter (LPF) processing on the reference G (Gr) calculated in Step S12 to create a post-LPF reference G (Grf), and then returns to Step S01 to repeat the processing of the subsequent main routine.

<Stop Determination Logic Subroutine>
<Step S14: Determination of Estimated Stop Time ST>

The ECU 41 determines whether the stop determination time ST is equal to 0. If it is equal to 0, the ECU 41 proceeds to Step S15. If it is other than 0, the ECU 41 proceeds to Step S21.

<Step S15: Determination of the Post-LPF Reference G (Grf)>

The ECU 41 determines whether the post-LPF reference G (Grf) obtained in Step S13 is equal to 0. If it is equal to 0, the ECU 41 proceeds to Step S16. If it is other than 0, the ECU 41 proceeds to Step S17.

<Step S16: Error Output>

On the assumption that an error has occurred in the stop determination processing, the ECU 41 generates a predetermined error signal and moves to a back-up mode.

<Step S17: Calculation of Estimated Stop Time ST>

The ECU 41 calculates the estimated stop time ST based on the time history of the vehicle speed V [N], and then proceeds to Step S18.

Figure 5:
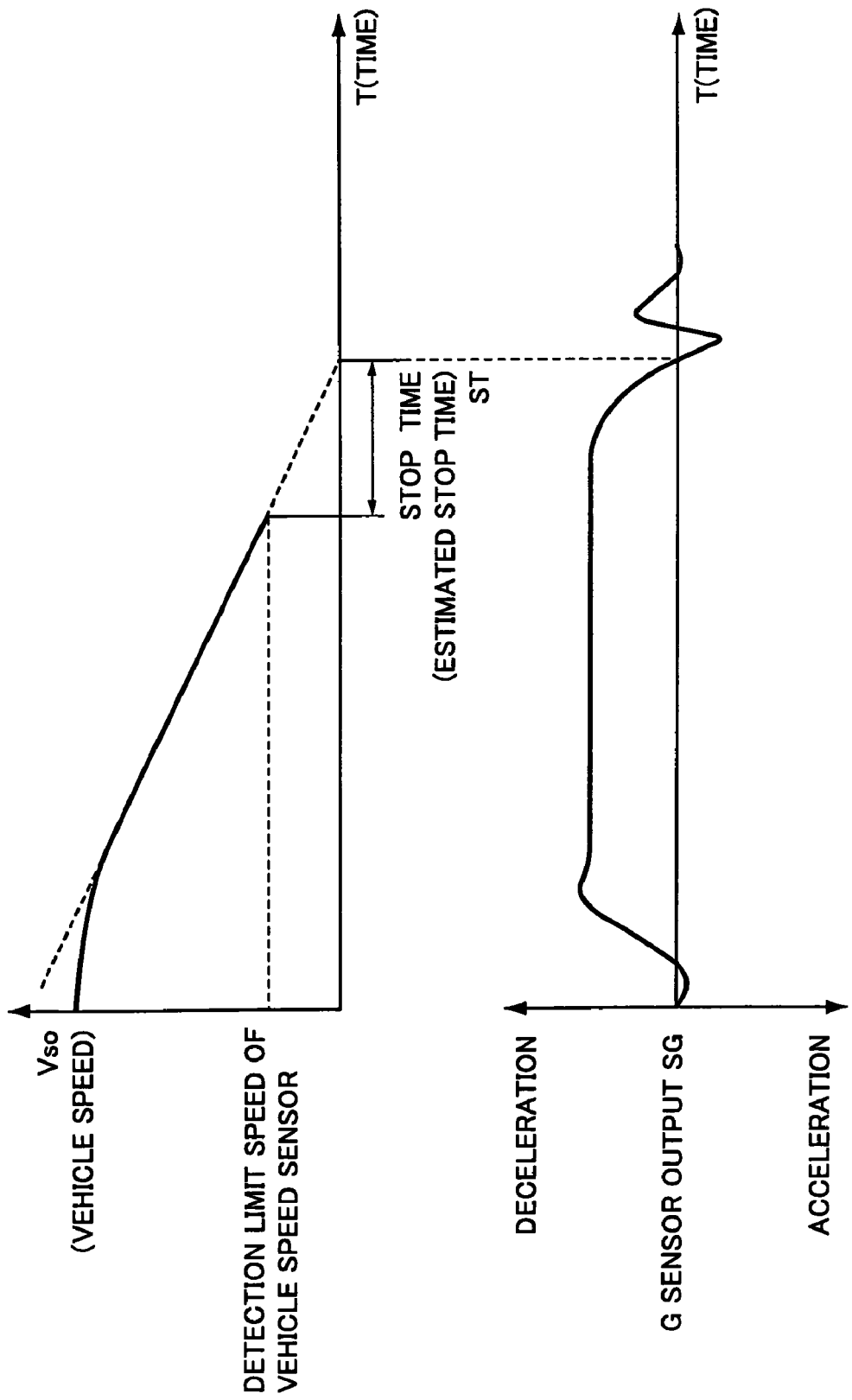
FIG. 5 shows graphs of exemplary time histories of the vehicle speed and the output of the G sensor of a vehicle which incorporates the electric parking brake system of FIG. 1.

FIG. 5 shows a graph of the detected vehicle speed V based on the output of the vehicle speed sensor, and a graph of an example of the time history of the G sensor output SG during normal brake application in a vehicle according to this embodiment.

In principle, the vehicle speed sensor 61 cannot detect vehicle speeds, for example, such as an extremely low speed equal to or less than 2 km/h (speed detection limit) and thus its reading is maintained, for example, at 0 km/h within the speed range of 0 to 2 km/h.

Accordingly, as shown in FIG. 5, when the vehicle is being decelerated to a stop and has reached a vehicle speed of 2 km/h, the ECU 41 calculates the estimated stop time ST, for example, by linear interpolation based on the immediately preceding rate of change in the vehicle speed (deceleration) and the speed detection limit of 2 km/h.

That is, the estimated stop time is an estimated time required for the vehicle to be brought to a stop assuming that the same deceleration will be maintained which was given when the speed was still able to be detected.

More specifically, the estimated stop time ST is calculated by Equation 2 below;

$$ST(s) = V[0](km/h)/Grf(m/s^2) \times 1000/3600 \quad \text{(Eq. 2)}$$

<Step S18: Comparison Between Estimated Stop Time ST and Maximum Estimated Stop Time STL>

The ECU 41 compares the estimated stop time ST calculated in Step S17 with a maximum estimated stop time (stop time limit) STL or a pre-set upper limit value for the estimated stop time ST. If the estimated stop time ST is greater than the maximum estimated stop time STL, the ECU 41 proceeds to Step S19. If the estimated stop time ST is equal to or less than the maximum estimated stop time STL, the ECU 41 proceeds to Step S20.

<Step S19: Changing of Estimated Stop Time ST to Maximum Estimated Stop Time STL>

The ECU 41 redefines the aforementioned maximum estimated stop time STL as a new estimated stop time ST in place of the estimated stop time ST that was calculated in Step S17, and then proceeds to Step S20.

<Step S20: Starting of Stop Determination Timer>

The ECU 41 starts timing with a stop determination timer, and then proceeds to Step S21.

The stop determination timer is used to estimate when a stop of the vehicle has occurred, based on elapsed time after the vehicle speed has become equal to or less than the speed detection limit and the vehicle speed sensor can no longer detect the vehicle speed.

<Step S21: Determination of Timer Value>

The ECU 41 compares a timer value T of the stop determination timer which was started in Step S20 with the estimated stop time ST defined in each of Steps S17 to S19 and a pre-set stop control time SCT. Here, the stop control time SCT is a stand-by time limit for automatically making a determination of a stop when the vehicle body speed Vso has been 0 for longer than this pre-set period.

Then, if the timer value T is equal to or greater than the stop control time SCT, the ECU 41 proceeds to Step S26 (backup stop determination). If it is below the stop control time SCT and equal to or greater than the estimated stop time ST, the ECU 41 proceeds to Step S22. Otherwise, the ECU 41 proceeds to Step S23.

<Step S22: Setting of Stop Determination Flag Fst Based on Estimated Stop Time>

The ECU 41 gives a value of 1 to the stop determination flag Fst, the flag indicating that the stop determination condition has been satisfied based on the estimated stop time ST, and then proceeds to Step S23.

<Step S23: Determination of Reversal of the G Sensor Output SG>

The ECU 41 determines whether the product of the current G sensor output SG and the previous G sensor output SGold stocked in Step S02 is equal to or less than 0. If it is equal to or less than 0, the ECU 41 proceeds to Step S24 on the assumption that the stop determination condition has been satisfied based on the G sensor output. If it is greater than 0, the ECU 41 proceeds to Step S25 on the assumption that the condition has not yet been satisfied.

Here, when the vehicle stops, it is subjected to such a change in behavior in the direction of pitching that the front portion of the vehicle is lifted upwardly. This is caused by the front suspension being restored (extended), due to its repulsive force, from the state (nosedive state) in which the front suspension is stroked towards a bounding (shrinking) side by inertial force during deceleration and thus accumulates energy. At this time, as shown in FIG. 5, the longitudinal acceleration of the vehicle detected by the G sensor 43 is reversed from a deceleration side to an acceleration side, and thereafter, reversed again to the deceleration side. Finally, the behavior is converged, and the longitudinal acceleration eventually becomes 0.

As described above, the product of the G sensor output SG and the previous G sensor output SGold can be monitored, thereby allowing detection of such a change in behavior in the direction of pitching when the vehicle is stopped.

<Step S24: Setting of Stop Determination Flag Fsg Based on G Sensor Output>

The ECU 41 gives a value of 1 to the stop determination flag Fsg indicating that the stop determination condition has been satisfied based on the G sensor output SG, and then proceeds to Step S25.

<Step S25: Determination of the Stop Determination Flag Fst×Fsg>

The ECU 41 obtains the product of the stop determination flag Fst derived from the estimated stop time ST and the stop determination flag Fsg derived from the G sensor output SG. If the product is equal to 1 (i.e., both a stop determination based on the estimated stop time and a stop determination based on the G sensor output have been established), the ECU 41 proceeds to Step S26. Otherwise, the ECU 41 returns to the main routine to repeat the subsequent processing.

<Step S26: Delivery of Stop Determination>

The ECU 41 outputs the stop determination to end the series of processing steps. When the stop determination is outputted, the controller 40 activates the actuator unit 20 to allow the parking brake 10 to transition to a braking state (hill-hold) This will prevent any unintentional movement of the vehicle which may be caused by an inclination of a declining or inclining road or the like, even if the driver releases his or her foot from the brake pedal immediately after the vehicle has stopped.

<<Low-G Stop Determination Method (Second Mode)>>

Figure 6:
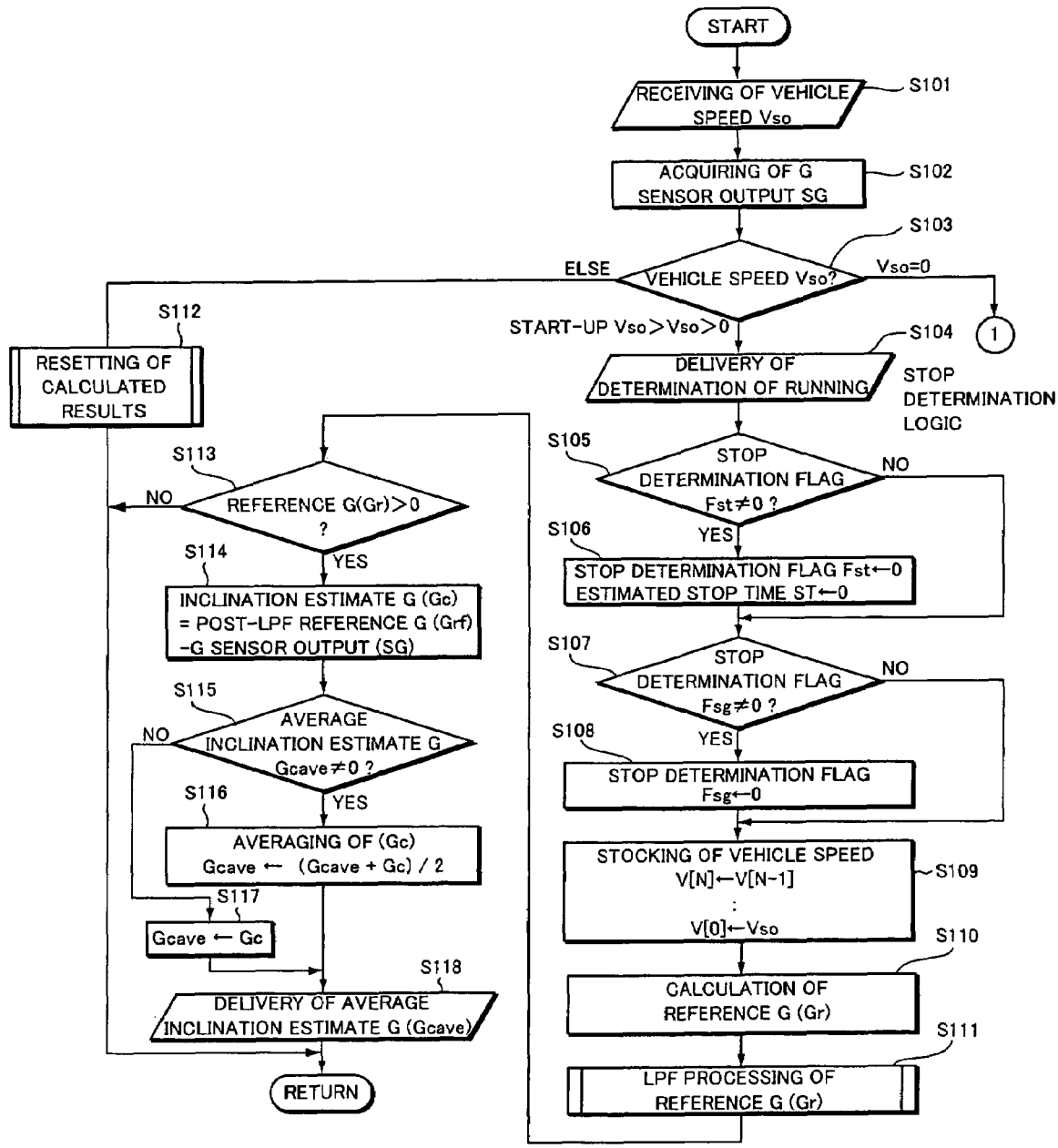
FIG. 6 is a first view of a flowchart showing a low-G stop determination method in the electric parking brake system of FIG. 1.
Figure 7:
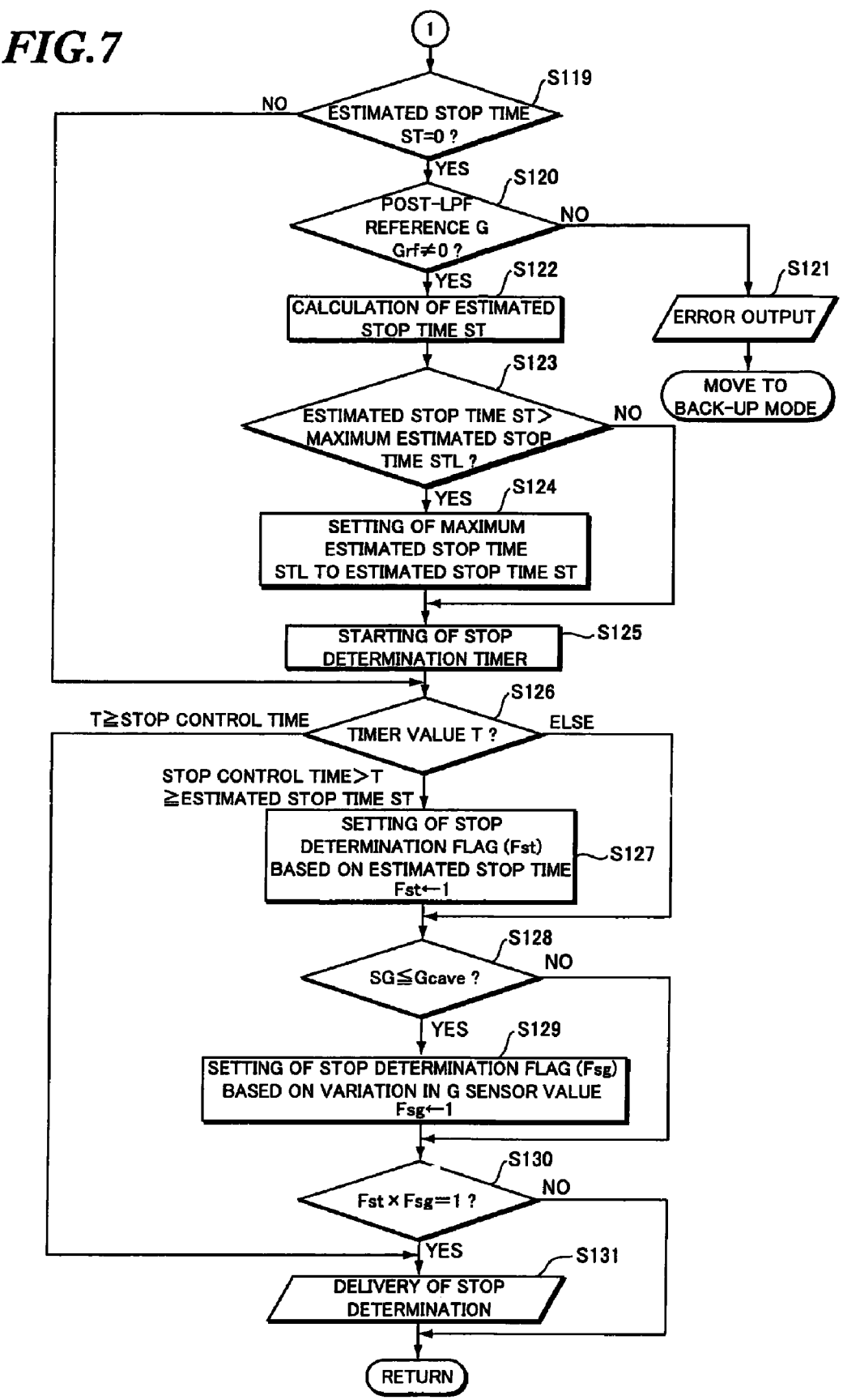
FIG. 7 is a second view of a flowchart showing a low-G stop determination method in the electric parking brake system of FIG. 1.

FIGS. 6 and 7 are a first view (main routine) and a second view (stop determination logic subroutine) of a flowchart showing a low-G vehicle stop determination method in the electric parking brake system of this embodiment.

In the description below, like sections as those of the aforementioned high-G stop determination method will not be described in detail, but only different points will be discussed.

<Main Routine>

<Step S101 and Step S102>

In each of Steps S101 and S102, the ECU 41 performs substantially the same processing steps as each of Steps S01 and S02 above, and then proceeds to Step S103 after Step S102 is completed.

<Step S103: Determination of Vehicle Body Speed Vso (Vehicle Speed Detection Step)>

The ECU 41 compares the current vehicle body speed Vso with Vso (start-up Vso) at the start of the process. If the current vehicle body speed Vso is less than the start-up Vso and greater than 0, the ECU 41 proceeds to Step S104. If the current vehicle body speed Vso is equal to 0, the ECU 41 proceeds to Step S119 to initiate processing of the subsequent stop determination logic subroutine (FIG. 7). Otherwise, the ECU 41 proceeds to Step S112.

<Steps S104 to S111>

In each of Steps S104 to S111, the ECU 41 performs substantially the same processing steps as the Steps S06 to S13 above, and then proceeds to Step S113 after Step S111 is completed.

<Step S112: Resetting of Calculated Results>

The ECU 41 deletes all the internally calculated results in the previous Steps from S01 to S04 inclusive, resets each parameter such as SGold, V[0, . . . , N], Fst, Fsg, Gr, Grf, Gc, Gcave, and T, and then returns to Step S101 to repeat the processing of the subsequent main routine.

<Step S113: Determination of Reference G>

The ECU 41 determines whether the reference G (Gr) obtained in Step S110 is greater than 0. If it is greater than 0, the ECU 41 proceeds to Step S114. If it is equal to or less than 0, the ECU 41 returns to Step S101 to repeat the subsequent processing.

(Return)

<Step S114: Calculation of Inclination Estimate G>

Assume that the vehicle has stopped on a road surface on which the vehicle is currently running. In this case, the ECU 41 follows Equation 3 below to calculate an inclination estimate G (Gc) or an estimated value of the acceleration that is expected to act upon the vehicle due to the inclination of the road surface, and then proceeds to Step S115.

Inclination estimate $G$ ($Gc$)=Post-LPF reference $G$ ($Grf$)–$G$ sensor output ($SG$)  (Eq. 3)

<Step S115: Determination of Average Inclination Estimate G>

The ECU 41 determines whether an average inclination estimate G (Gcave), an average value of the aforementioned inclination estimates G (Gc) is equal to 0. If it is other than 0, the ECU 41 proceeds to Step S116. If it is equal to 0, the ECU 41 proceeds to Step S117.

<Step S116: Averaging of Inclination Estimate G>

The ECU 41 adds the previous average inclination estimate G (Gcave) to the inclination estimate G (Gc) calculated in Step S114 and divides the resulting value by 2 to derive their average value. Then, the ECU 41 takes this average value as a new average inclination estimate G (Gcave) and thereby updates the same, and then proceeds to Step S118.

<Step S117: Setting of Average Inclination Estimate G>

The ECU 41 sets the immediate inclination estimate G (Gc) calculated in Step S114 to the average inclination estimate G (Gcave) and then proceeds to Step S118.

<Step S118: Delivery of Average Inclination Estimate G>

The ECU 41 outputs the average inclination estimate G (Gcave) that has been set in each of Steps S115 to S117, and then returns to Step S101 to repeat the subsequent processing. (Return)

<Stop Determination Logic Subroutine>

<Steps S119 to S127>

In each of Steps S119 to S127, the ECU 41 performs substantially the same processing steps as the Steps S14 to S22 above, and then proceeds to Step S128 after Step S127 is completed.

<Step S128: Comparison of G Sensor Output and Average Inclination Estimate G>

The ECU 41 compares the G sensor output SG with the average inclination estimate G (Gcave). If the G sensor output SG is equal to or less than the average inclination estimate G (Gcave), the ECU 41 proceeds to Step S129 on the assumption that the stop determination condition has been satisfied based on the G sensor output SG. Otherwise, the ECU 41 proceeds to Step S130 on the assumption that the condition has not yet been satisfied.

Figure 8:
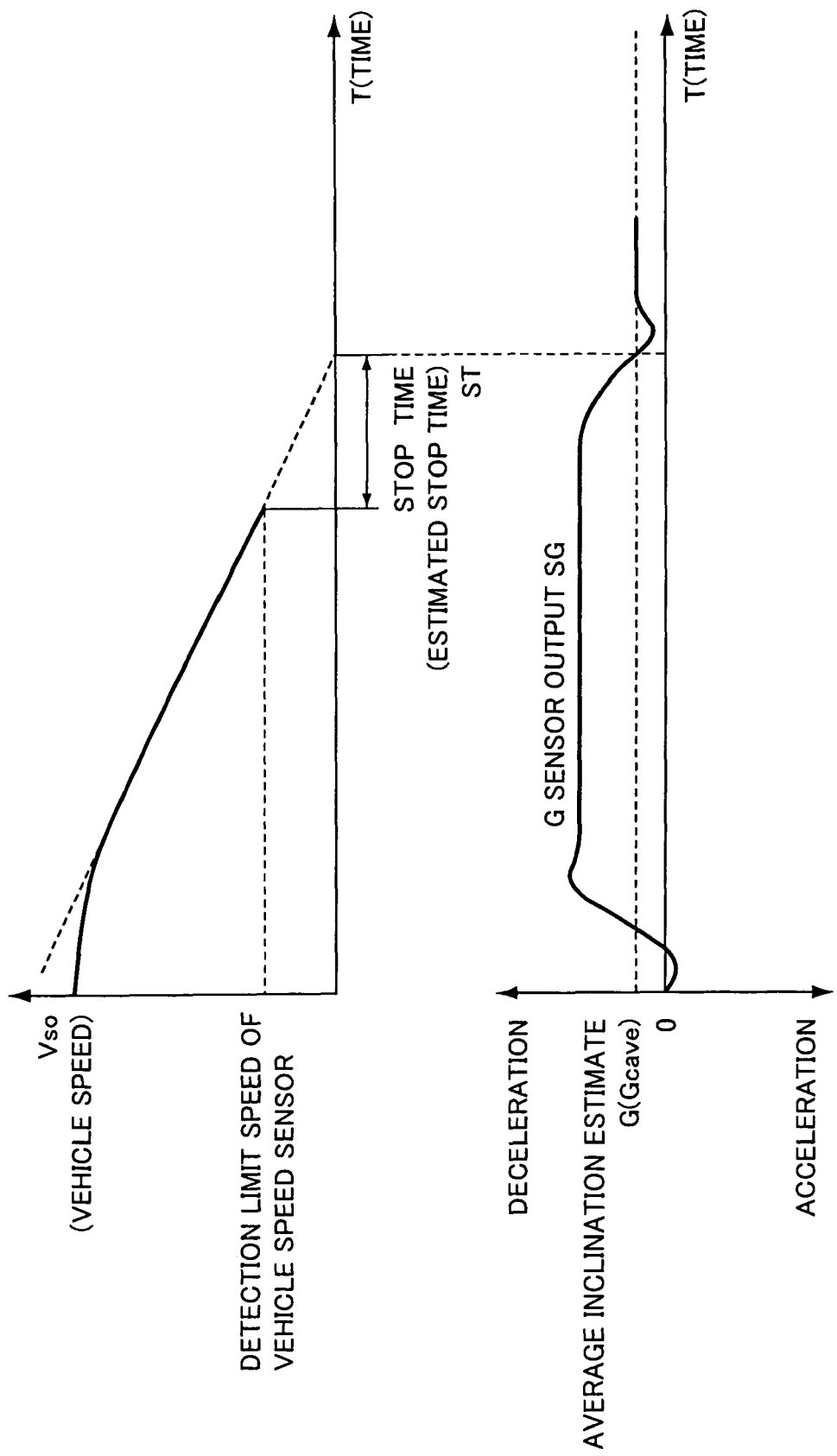
FIG. 8 is a graph showing other exemplary time histories of the vehicle speed and the output of a G sensor of a vehicle which incorporates the electric parking brake system of FIG. 1.

FIG. 8 shows a graph of the detected vehicle speed V based on the output of the vehicle speed sensor and a graph of another exemplary time history of the G sensor output SG during a gradual brake application in the vehicle according to this embodiment.

FIG. 8 shows the history of a vehicle being braked gradually and brought to a stop while running downhill. In such conditions, no noticeable nosedive occurs with the vehicle, thus causing only a small variation in longitudinal G due to a change in behavior in the direction of pitching as the vehicle is stopped. Furthermore, the vehicle is subjected to continuous acceleration caused by the inclination of the downhill so as to be decelerated. Thus, in the example shown in FIG. 8, the G sensor output SG is on the deceleration side of the graph all the time during deceleration until and even after the vehicle is brought to a stop, thereby causing no reversal of the G sensor output SG as is used for a stop determination in the high-G stop determination method.

In this regard, the low-G stop determination method employs the average inclination estimate G (Gcave), an estimated value of an acceleration caused by the inclination of a road surface, as a threshold value which is in turn compared with the G sensor output SG. It is thus used as a factor for making a stop determination for the vehicle that they are equal to each other or reversed.

<Step S129 to Step S131>

In each of Steps S129 to S131, the ECU 41 performs substantially the same processing steps as the aforementioned Steps S24 to S26, and then ends the series of processing steps.

As described above, the first embodiment can provide the following effects.

(1) During normal deceleration with a comparatively large deceleration G, a change in behavior in the direction of pitching from the nosedive state caused by a repulsive force of the front suspension to its normal state is detected to correspondingly determine a stop of the vehicle. The stop of the vehicle can thus be accurately determined at extremely low speeds equal to or less than the speed detection limit of the vehicle speed sensor. This allows for the electric parking brake to transition from a released state to a braking state. For example, brakes can be applied before the vehicle is brought to a full stop, thereby producing a deceleration G that is not intended by a passenger. It is also possible to prevent the vehicle from unintentionally moving during a time lag after the vehicle is stopped but before the application of the parking brake becomes effective.

(2) A determination of a stop of a vehicle can be made with further improved accuracy by using an estimated stop time calculated based on a deceleration of the vehicle in addition to a change in behavior of the vehicle in the direction of pitching of the vehicle.

(3) During a gradual deceleration with a comparatively small deceleration G, the inclination estimate G is derived from the difference between the reference G calculated based on the output of the vehicle speed sensor and the G sensor output to determine a stop of the vehicle in response to the G sensor output being less than their average value. This makes it possible to accurately determine the stop of the vehicle even when no noticeable nosedive occurs to the vehicle and a reversal of the longitudinal G, which is caused by a change in behavior in the direction of pitching, is difficult to detect.

(4) The behavior of the vehicle in the direction of pitching of the vehicle can be detected based on a change (or a reversal) in longitudinal acceleration from a deceleration side to an acceleration side. This makes it possible to employ the G sensor, which is used with the electric parking brake to determine an inclination, for detecting a behavior in the stop determination as well, thereby simplifying the overall arrangement.

(5) The stop control time SCT is set as a predetermined stand-by time, so that a stop determination is made irrespective of other parameters when the stop control time SCT has elapsed after the output of the vehicle speed sensor 61 has become 0 km/h. This allows a stop determination to be made even when part of the arrangement such as the G sensor 43 has failed, thereby providing an improved fail-safe property.

MODIFIED EXAMPLES

It is to be understood that various modifications and variations can be made to the present invention without being limited to the aforementioned embodiment, and those modifications and variations fall within the scope of the present invention.

(1) This embodiment relates, for example, to a stop determination for the electric parking brake system; however, the vehicle stop determination method and apparatus of the present invention are not limited thereto. The invention may also be applicable to any other applications which require a determination of a stop of a vehicle, and is preferably applicable particularly to those in which the determination of a stop is employed as a trigger to perform switching between activation and deactivation. For example, the method and apparatus are also applicable to a stop determination in stop-and-go traffic or to a stop determination for determining the possibility of an idle stop.

(2) The embodiment is adapted to detect a change in behavior of the vehicle in the direction of pitching of the vehicle, for example, based on a reversal of the longitudinal G from the deceleration side to the acceleration side; however, the present invention is not limited thereto. The invention may also be adapted to detect the change based on the suspension stroke in the case of a vehicle that is equipped with a stroke sensor for detecting the stroke of the suspension. On the other hand, for the G sensor being employed for detection, the detection may also be performed not only using the longitudinal G but also using, for example, an acceleration in another direction such as a vertical G.

(3) The configuration of the electric parking brake system is not limited to the one according to the embodiment but may also be modified as appropriate.

For example, the parking brake of the embodiment has a drum disposed on the inner diameter side of a brake disc for the foot brake; however, the parking brake may be of another type. For example, the parking brake may be formed such that a disk brake or a drum brake for the foot brake and its frictional materials are commonly used to be integrated with the parking brake.

Furthermore, the parking brake of the embodiment employs an electric actuator secured on the vehicle body side to drive the parking brake via a parking brake cable; however, the invention is not limited thereto. For example, the invention is also applicable to a so-called built-in electric parking brake in which an electric actuator is provided on the wheel hub side to be integrated with the parking brake.

(4) The embodiment is adapted to select between the high-G stop determination method and the low-G stop determination method based on the reduction rate of the vehicle speed delivered by the vehicle speed sensor; however, the invention is not limited thereto. The invention may also be adapted to select between the methods based on the deceleration G detected by the G sensor, for example.

Second Embodiment

A description will now be made of an electric parking brake system in accordance with a second embodiment of the present invention.

Figure 9:
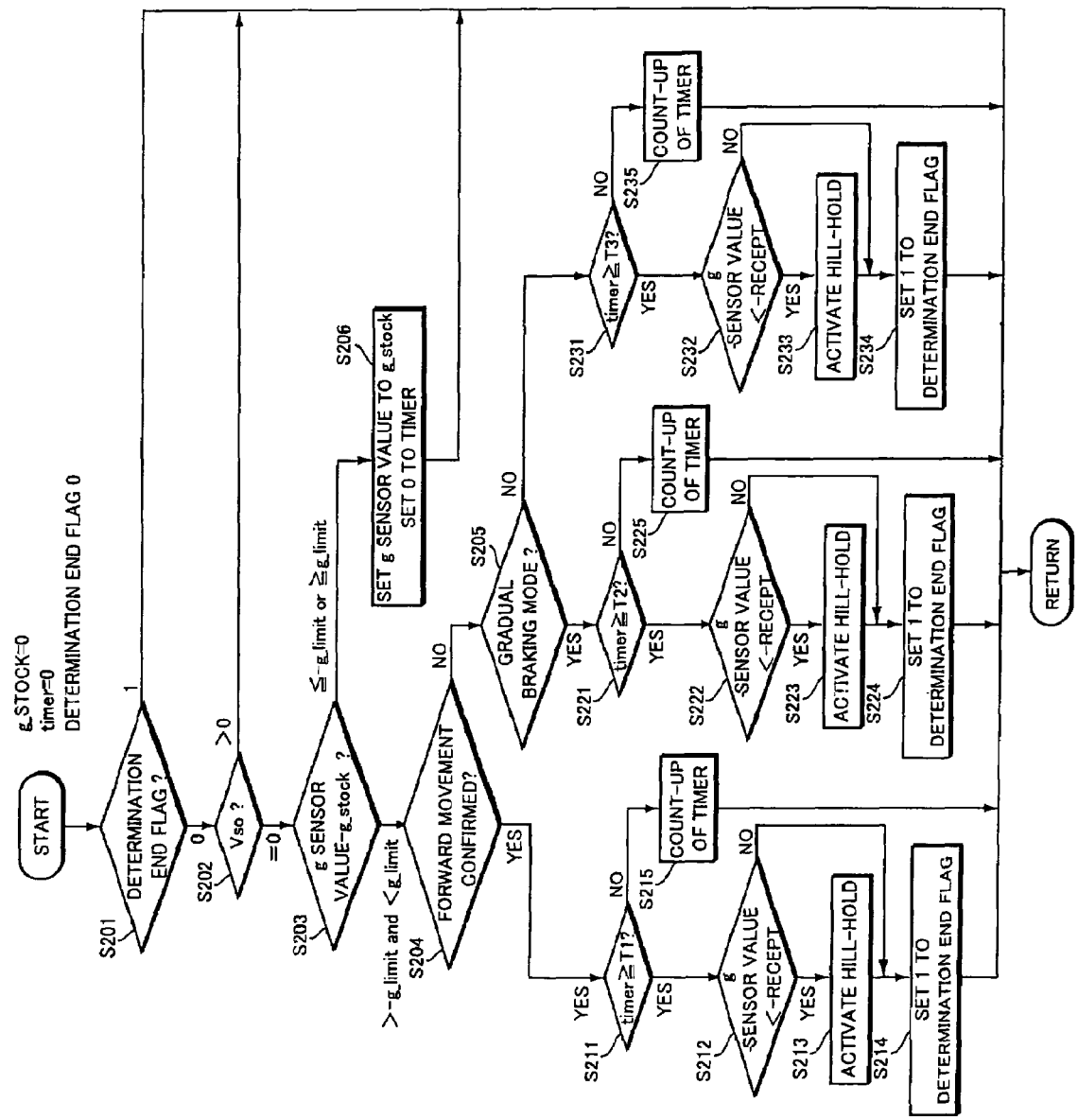
FIG. 9 is a flowchart showing the logic of the stop and inclination determinations in the electric parking brake system of FIG. 1.
Figure 10:
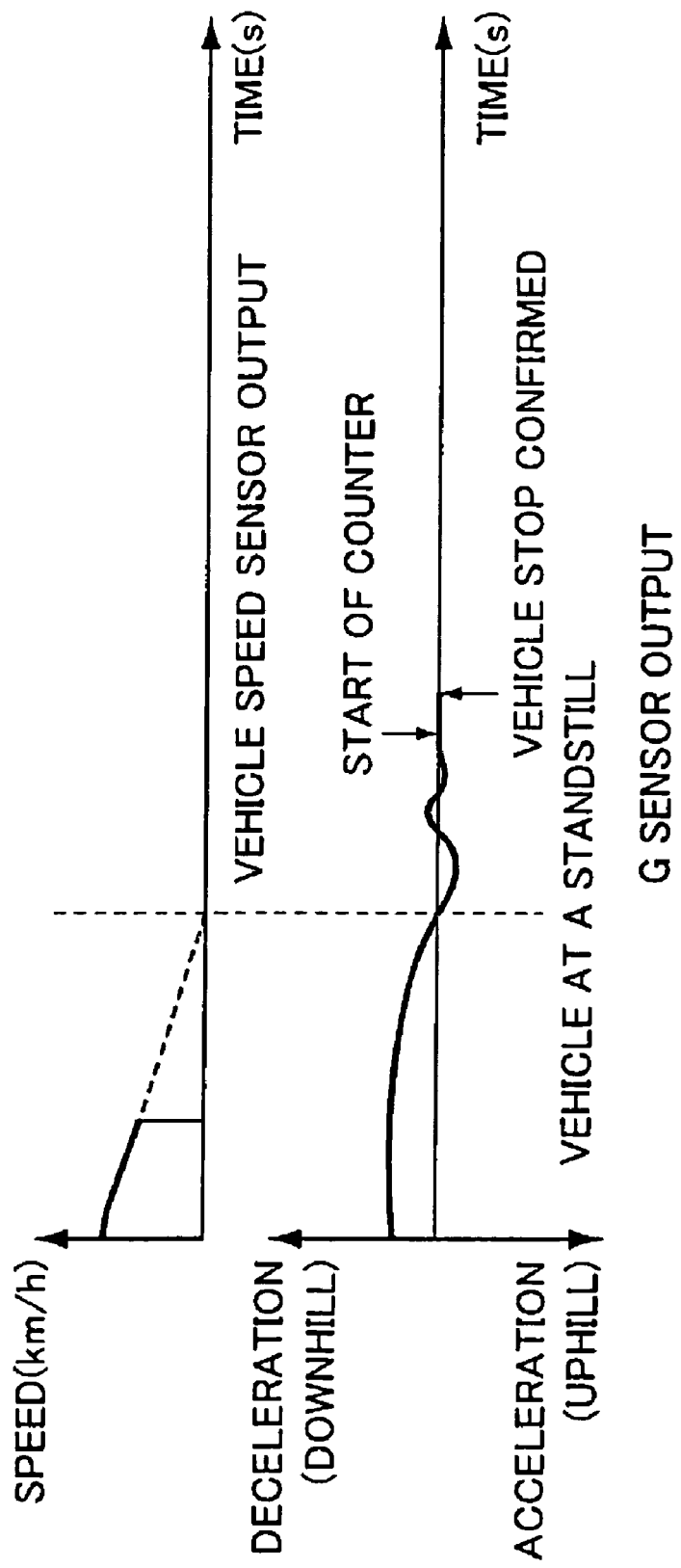
FIG. 10 shows graphs of histories of the vehicle speed sensor output and the G sensor output of a vehicle, which includes the electric parking brake system of FIG. 1, when the vehicle is stopped.

FIG. 9 is a flowchart showing the logic of the stop and inclination determinations for the electric parking brake system of the second embodiment. FIG. 10 shows graphs of the histories of the vehicle speed sensor output and the G sensor output of a vehicle being stopping, in which the vehicle includes the electric parking brake system of the second embodiment.

The steps of the operation of FIG. 9 will be described below in the order in which they appear.

To begin with, those variables that are used in the description below will be explained.

"g_stock" or a g sensor value or an output from the G sensor 43, which is temporarily retained by the ECU 41, is equal to 0 in the initial state (at the start of logic) and will be updated, when "timer" is reset, with a g sensor value given then, as will be discussed later.

"timer" is a timer value indicative of a duration of a state in which the absolute of the value obtained by subtracting the g_stock from the g sensor value is less than g_limit or a pre-set threshold value. The "timer" is counted up by the timer function included in the ECU 41 and has an initial value of 0.

A determination end flag, which is indicative of whether a stop determination has been established, is retained within the ECU 41, and is set to 0 before the establishment of as top determination and to 1 after the establishment.

<Step S201: Determination of Determination End Flag>

The ECU 41 determines the state of the determination end flag. The ECU 41 proceeds to Step S202 if it is 0 and returns if it is 1.

<Step S202: Determination of Vehicle Speed Vso>

The ECU 41 proceeds to Step S203 if the current vehicle speed Vso detected based on the output of the vehicle speed sensor 61 is equal to 0 (the vehicle speed is equal to or less than the speed detection limit of the vehicle speed sensor). If it is greater than 0, the ECU 41 returns.

Here, the vehicle exhibits a pitching behavior while the vehicle is stopped, as described below.

Figure 11:
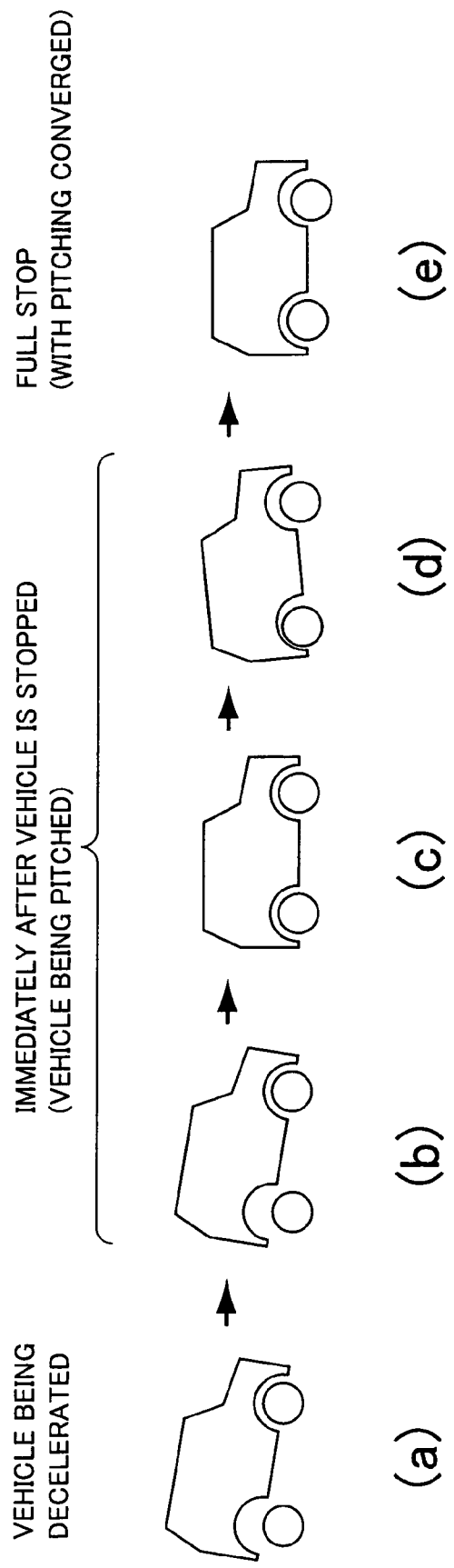
FIG. 11 is a schematic diagram illustrating pitching when a vehicle is stopped.

FIG. 11 is a schematic diagram of the pitching of the vehicle, (a) showing the vehicle being decelerated before it is stopped; (b), (c), and (d) showing the vehicle being oscillated by pitching immediately after the vehicle is stopped; and (e) the vehicle being brought to a full stop with the pitching converged.

As shown in (a), during deceleration, the vehicle is in a nosedive state with the front suspension compressed due to inertial force and energy conserved.

Then, as shown in (b), the vehicle being brought to a stop in the nosedive state will be subjected to no more inertial force due to the deceleration. This causes the front suspension, which has been compressed, to extend due to its resilient reactive force, thereby allowing the vehicle to restore its horizontal attitude as shown in (c) and then take a nose-up state as shown in (d).

Thereafter, the vehicle exhibits an pitching oscillation in which the states of (b) to (d) are repeated. However, the amplitude will be gradually attenuated due to action of the damper or the like of the suspension, eventually being converged as shown in (e).

As shown in FIG. 10, during such an pitching oscillation, the output of the G sensor 43 indicates a waveform having positive and negative values alternately reversed, with its amplitude being correlated with the amplitude of the pitching oscillation.

<Step S203: Determination of g Sensor Value—g_stock>

When a value obtained by subtracting the g_stock from the g sensor value is equal to or less than −g_limit or equal to or greater than g_limit, the ECU 41 assumes that the aforementioned pitching has not yet been converged, and then proceeds to Step S206. If the value is less than the g_limit and greater than the −g_limit, the ECU 41 assumes that the pitching has been converged, and then proceeds to Step S204.

<Step S204: Determination of Forward Movement Confirmation>

The ECU 41 determines whether a forward movement determination has been confirmed, i.e., whether the vehicle is running under a normal forward movement. Here, for example, the forward movement determination is confirmed when the output of the vehicle speed sensor 61 tends to increase over a predetermined period of time and the output of the G sensor 43 continues to detect an acceleration G for a predetermined period of time.

When the forward movement determination is confirmed, the ECU 41 proceeds to Step S211. If it is not confirmed, the ECU 41 proceeds to Step S205.

<Step S205: Determination of Gradual Braking Mode>

The ECU 41 determines whether the state of the vehicle has satisfied a predetermined gradual braking mode condition when it is being stopped. For example, assume that the ECU 41 determines that the vehicle has been subjected to gradual braking, based on the output of the G sensor 43 provided when the vehicle is being stopped, the history of the vehicle speed sensor output, the pressure for pressing the brake pedal (not shown), or the fluid pressure of the brake master cylinder (not shown). In this case, the ECU 41 assumes that the gradual braking mode condition has been satisfied, and then proceeds to Step S221. Otherwise, the ECU 41 proceeds to Step S231. Here, when the ECU 41 proceeds to Step S231, the vehicle is in a running mode in which the vehicle is repeatedly launched or stopped as in stop-and-go traffic in a short period of time, for example, within a few seconds.

<Step S206: Resetting of Variables>

The ECU 41 sets the g sensor value, i.e., the current output of the G sensor 43 to the aforementioned g_stock value, 0 to the value of "timer", and then returns.

<Step S211: Determination of Timer Value>

The ECU 41 compares the value of "timer" with T1 or a predetermined threshold value. If timer ? T1, the ECU 41 proceeds to Step S212. Otherwise, the ECU 41 proceeds to Step S215.

Here, T1 is a time serving as a condition for the stop determination section 41b of the ECU 41 to establish a stop determination when the absolute of a value obtained by subtracting the g_stock from the g sensor value continues to be less than the g_limit over a longer period of time than T1.

<Step S212: Comparison of g Sensor Value>

The inclination determination section 41c of the ECU 41 determines whether the g sensor value or the current output of the G sensor 43 is less than a predetermined constant or –RECEPT. If so, it is assumed that the vehicle is stopped on a declining or inclining road and an additional pull is required of the hill-hold function, and the ECU 41 proceeds to Step S213. Otherwise, the ECU 41 skips Step S213 to proceed to Step S214.

<Step S213: Activation of Hill-Hold>

The ECU 41 allows electric drive power to be supplied through the relay 42 to the actuator unit 20 for its activation. This causes the parking brake 10 to transition from a released state to a braking state as well as its braking force to be set to an inclined road braking force that is greater than a flat road braking force. The ECU 41 then proceeds to Step S214.

<Step S214: Changing of Determination End Flag>

The ECU 41 sets 1 to the determination end flag, and then returns.

<Step S215: Count-Up of Timer>

The ECU 41 counts up "timer" or the aforementioned timer value and then returns.

<Step S221: Determination of Timer Value>

The ECU 41 compares the value of "timer" with T2 or a predetermined threshold value different from the aforementioned T1. If timer ? T2, then the ECU 41 proceeds to Step S222. Otherwise, the ECU 41 proceeds to Step S225.

Here, the threshold value T2 is defined to be greater (longer in time) than the threshold value T1 for a normal stop. This is done to prevent the parking brake 10 from being actuated at an early stage to avoid feeling of the brake being hooked when the vehicle is stopped by gradual brake application that is less in deceleration than for a normal stop.

<Step S222 to Step S225>

In the Steps S222 to S225, the ECU 41 performs substantially the same processing steps as the aforementioned Steps S212 to S215.

<Step S231: Determination of Timer Value>

The ECU 41 compares the value "timer" with T3 or a predetermined threshold value different from T1 and T2 discussed above. If timer ? T3, the ECU 41 proceeds to Step S232. Otherwise, the ECU 41 proceeds to Step S235.

Here, the threshold value T3 is defined to be greater (longer in time) than T1 and less (shorter in time) than T2.

<Step S232 to Step S235>

In Steps S232 to S235, the ECU 41 performs substantially the same processing steps as Steps S212 to S215 discussed above.

According to this embodiment described above, it is possible to provide the following effects.

(1) A stop determination is made according to a convergence of variations in the output of the G sensor 43 caused by pitching of the vehicle. This ensures that a stop determination can be made at an early stage after the vehicle is stopped because such pitching occurs when the vehicle is being stopped and is attenuated thereafter in a short period of time.

(2) A stop determination is established when the absolute of a difference obtained by subtracting the previous g sensor value or g_stock from the g sensor value or the output of the G sensor 43 is equal to or less than g_limit over a predetermined period of time. This allows for making an appropriate stop determination using a simple logic.

(3) The actuator unit 20 for actuating the parking brake 10 is activated using the result of the aforementioned stop determination. This will prevent erroneous actuation before the vehicle is stopped or an increase in time lag from a stop of the vehicle until application of brakes, thereby allowing the parking brake 10 to be properly actuated.

(4) After variations in the output of the G sensor 43 have converged, the target braking force of the parking brake 10 is set based on the output. This eliminates the effects of vehicle pitching, thereby making it possible to accurately detect an inclination of a road surface and thereby properly set the braking force.

(5) The threshold values T1, T2, and T3 of the timer value ("timer") are changed according to a state such as of the deceleration occurring when the vehicle is stopped. This allows for making a stop determination and actuating the parking brake 10 with a proper timing according to a difference in running state.

MODIFIED EXAMPLE

It is to be understood that various modifications and variations can be made to the present invention without being limited to the aforementioned embodiment, and those modifications and variations fall within the scope of the present invention.

That is, the stop determination apparatus according to the aforementioned embodiment is used to control the electric parking brake; however, the stop determination apparatus of the present invention is also applicable to other applications. For example, the apparatus can also be applied to the control system of an automatic transmission, a cruise control system, an engine control system (idle stop) and so forth.

Third Embodiment

A description will now be made of an electric parking brake system in accordance with a third embodiment of the present invention.

Figure 12:
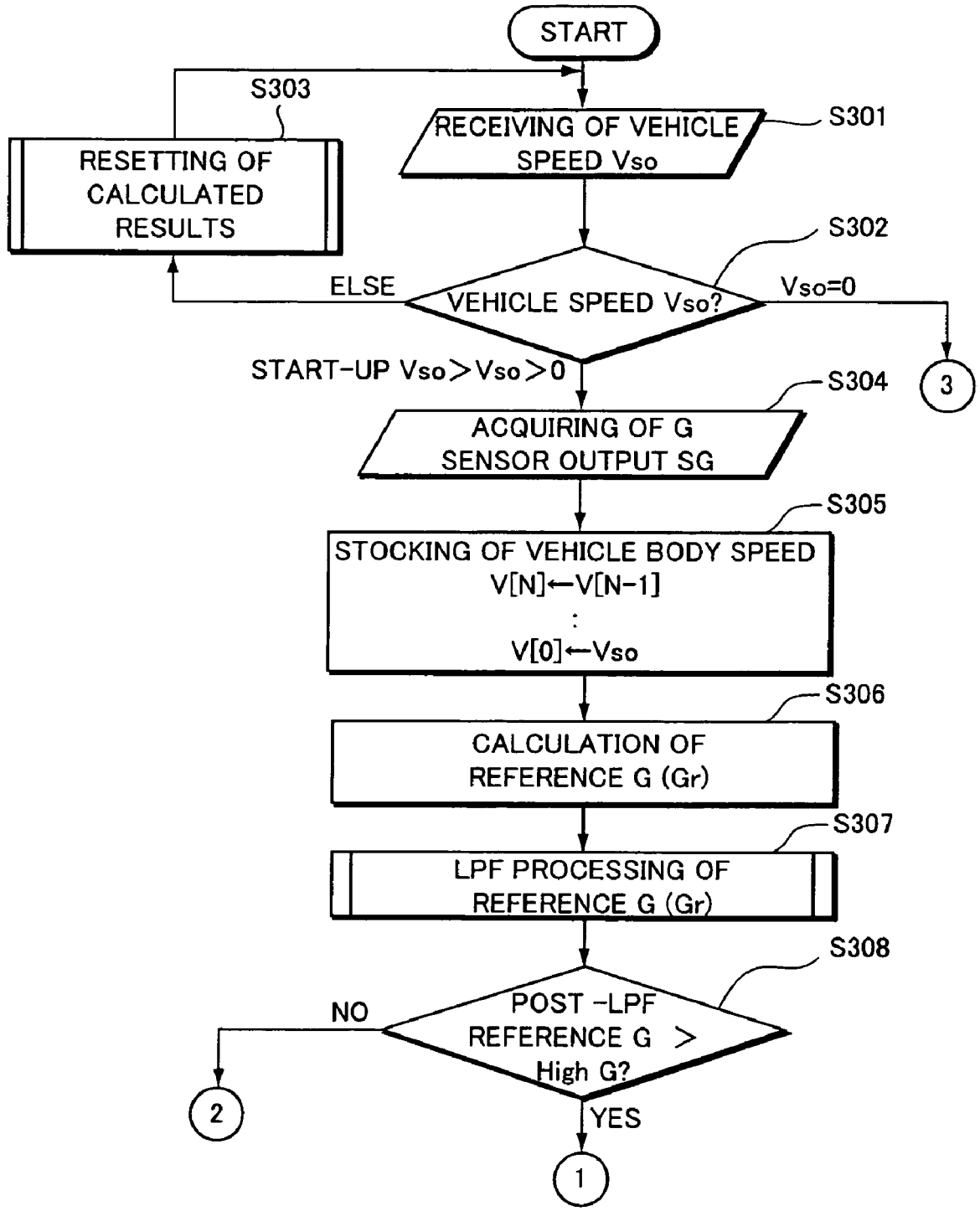
FIG. 12 is a first view of a flowchart showing an inclination determination in the electric parking brake system of FIG. 1.
Figure 13:
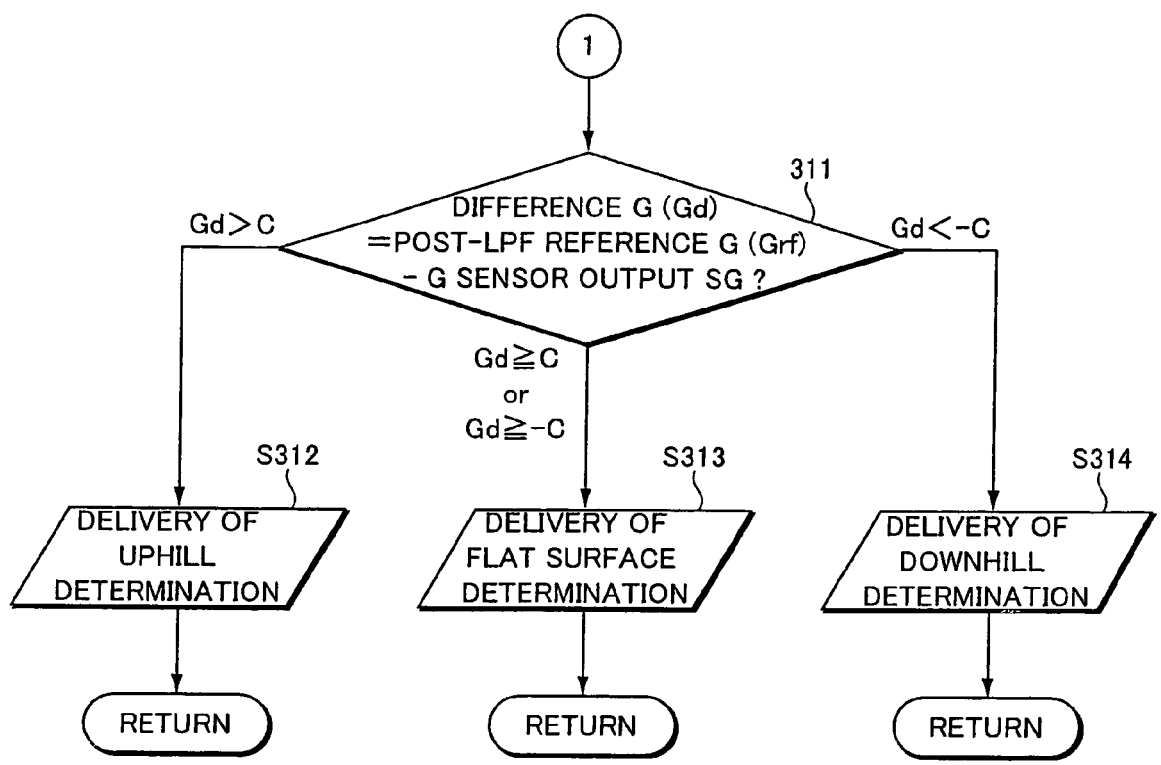
FIG. 13 is a second view of a flowchart showing an inclination determination in the electric parking brake system of FIG. 1.
Figure 14:
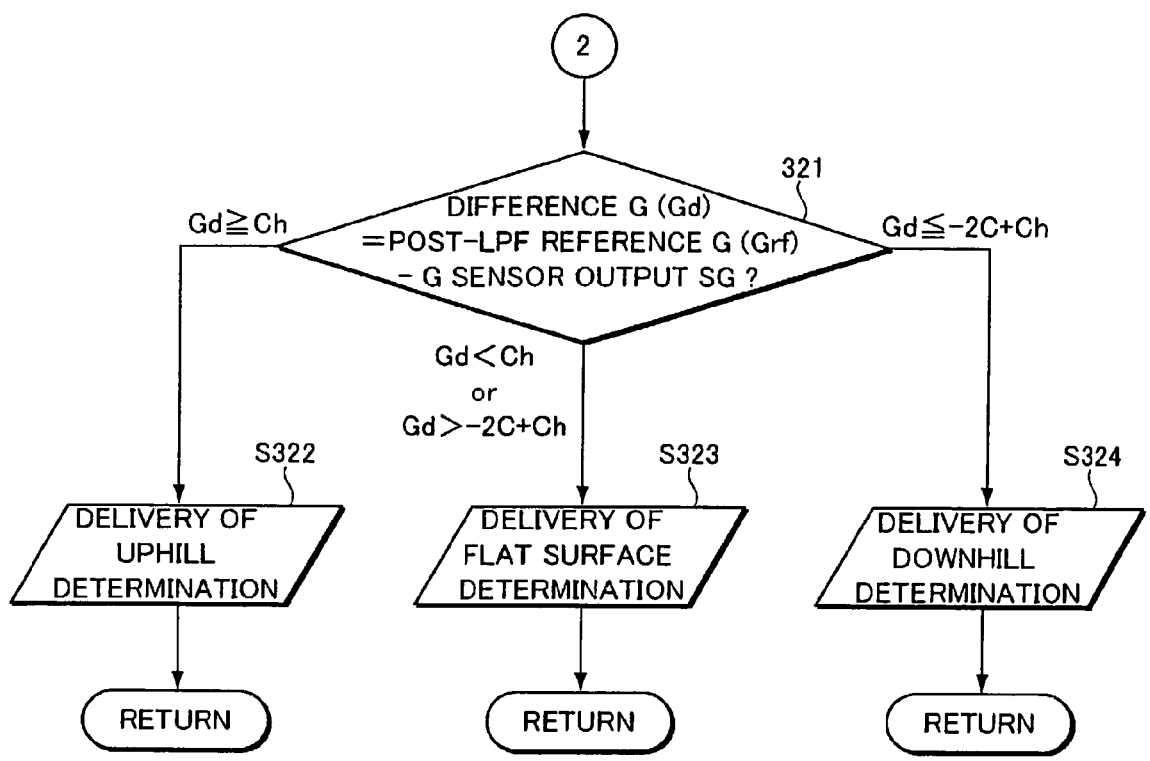
FIG. 14 is a third view of a flowchart showing an inclination determination in the electric parking brake system of FIG. 1.
Figure 15:
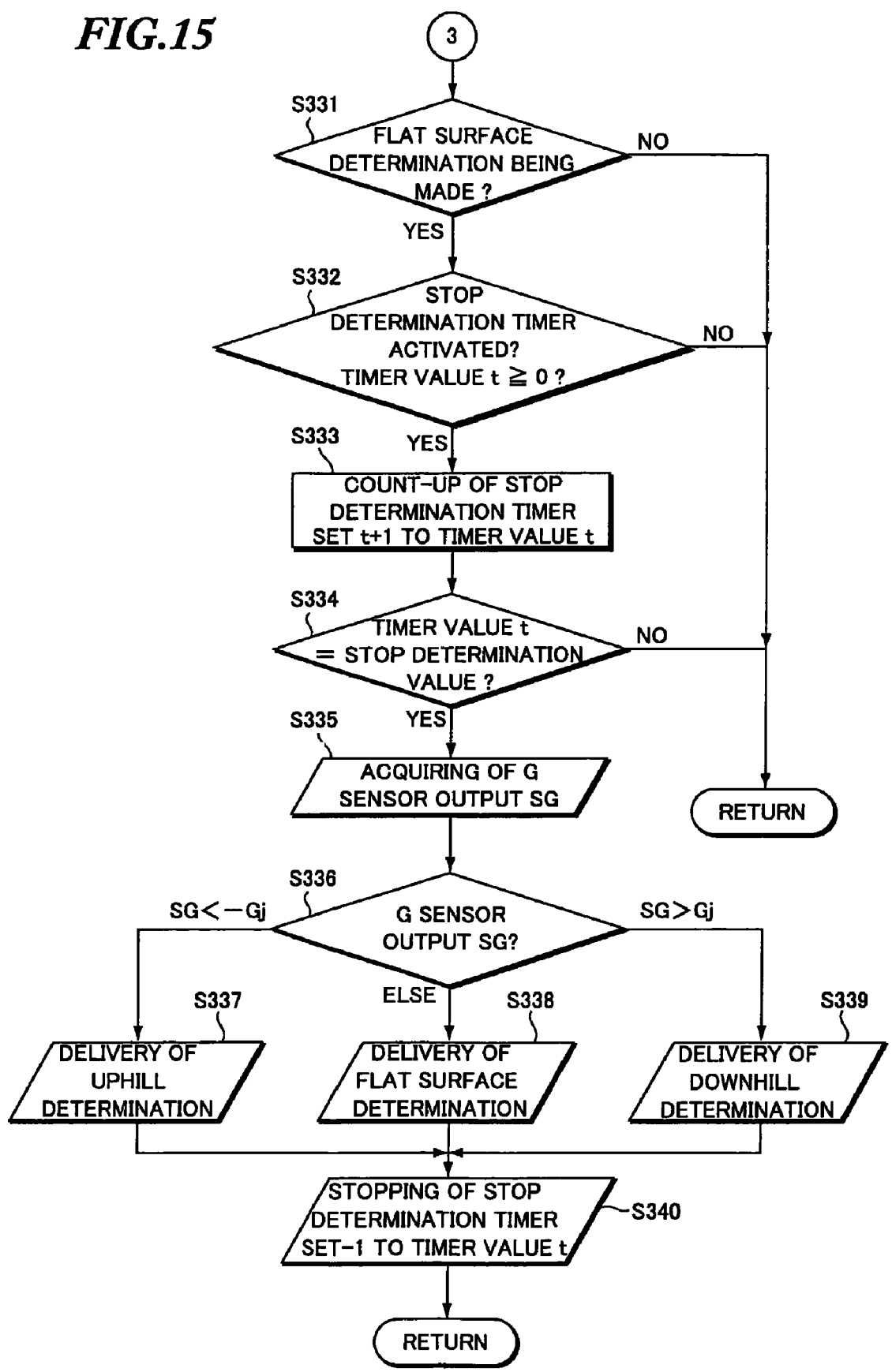
FIG. 15 is a fourth view of a flowchart showing an inclination determination in the electric parking brake system of FIG. 1.

FIG. 12 is a view of the main routine of a flowchart showing an inclination determination method according to the third embodiment. FIG. 13 is a view of a subroutine for an inclination determination in a normal G region, FIG. 14 shows a subroutine for an inclination determination in a high G region, and FIG. 15 shows a subroutine for a backup inclination determination.

The steps of the operation will be described below in the order in which they appear.

<Main Routine>

<Step S301: Receiving of Vehicle Body Speed Vso>

The ECU 41 of the controller 40 receives a vehicle body speed (vehicle speed) Vso, a running speed of the vehicle that has been detected by the on-board unit 60 using the vehicle speed sensor 61, and then proceeds to Step S302.

<Step S302: Determination of Vehicle Body Speed Vso>

The ECU 41 compares the current vehicle body speed Vso with Vso provided at the time of start of the processing (start-up Vso). If the current vehicle body speed Vso is less than the start-up Vso and greater than 0, the ECU 41 proceeds to Step S304. If the current vehicle body speed Vso is equal to 0, the ECU 41 proceeds to Step S331 (see FIG. 15) to initiate the processing of the subsequent backup inclination determination subroutine.

Otherwise, the ECU 41 proceeds to Step S303.

<Step S303: Resetting of Calculated Results>

The ECU 41 deletes all the internally calculated results in the aforementioned Steps S01 and S302 inclusive, resets each parameter such as V[0, ..., N], Gr, and Grf, and then returns to Step S301 to repeat the subsequent processing.

<Step S304: Acquiring of G Sensor Output SG>

The ECU 41 acquires the output SG from the G sensor 43, and then proceeds to Step S305. Here, the sign of the output SG of the G sensor 43 is defined to be positive on the deceleration side and negative on the acceleration side.

<Step S305: Stocking of Vehicle Body Speed V>

The ECU 41 updates stored time-series vehicle body speed data V[N] (N is an integer) with V[N−1], respectively, and stocks the current vehicle body speed Vso as V[0], then proceeding to Step S306.

<Step S306: Calculation of Reference G (Gr)>

The ECU 41 calculates the reference G (Gr) as expressed by Equation 1, or a deceleration G of the vehicle obtained by calculation based on the output of the vehicle speed sensor 61, and then proceeds to Step S307.

$$Gr(m/s^2) = (V[N](km/h) - V[0](km/h))/(T \times N) \times 1000/3600 \quad \text{(Eq. 1)}$$

where T is the reception interval (in seconds) of the vehicle body speed Vso.

<Step S307: LPF Processing of Reference G>

The ECU 41 performs predetermined low pass filter (LPF) processing on the reference G (Gr) calculated in Step S306 to create a post-LPF reference G (Grf), and then proceeds to Step S308.

Here, the aforementioned G sensor 43 is adjusted in gain such that the output SG is generally the same as the post-LPF reference G (Grf) when the vehicle is decelerated on a flat road with an inclination of the vehicle body being negligible.

<Step S308: Determination of Post-LPF Reference G>

The ECU 41 compares the post-LPF reference G (Grf) created in Step S307 with a high reference G discrimination value (High G) or a threshold value serving to stratify the deceleration of the vehicle into a predetermined high G region and a normal region having a less deceleration than the high G region. Then, if the post-LPF reference G is greater than the high reference G discrimination value, the ECU 41 proceeds to the inclination determination subroutine in the normal G region subsequent to Step S311 (see FIG. 13). Otherwise, the ECU 41 proceeds to the inclination determination subroutine in the high G region subsequent to Step S321 (see FIG. 14).

<Inclination Determination Subroutine in Normal G Region>

<Step S311: Determination of Difference G>

The ECU 41 calculates a difference G (Gd) by subtracting the G sensor output SG from the post-LPF reference G (Grf) to compare the difference G with predetermined constants, i.e., a criterion value C (C>0) and −C.

Then, the ECU 41 proceeds to Step S312 if Gd is greater than C, or to Step S314 if the difference G is less than −C. If the difference G is equal to or less than C and equal to or greater than −C, the ECU 41 proceeds to Step S313.

Here, a description will now be made of the principle that such a comparison can be employed to determine an inclination of a road surface.

Figure 16:
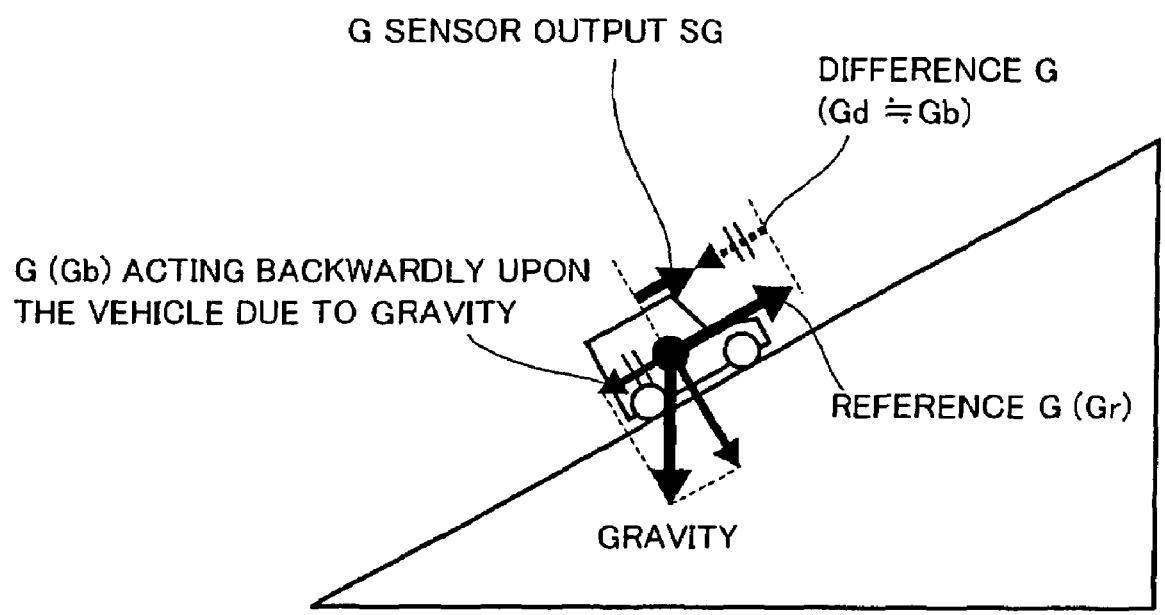
FIG. 16 is a schematic diagram illustrating the relation between the G sensor output and the reference G when a vehicle is stopped on an uphill.

FIG. 16 is a schematic diagram showing the relation between the G sensor output and the reference G when a vehicle is being stopped on an uphill road.

The G sensor output SG is a resultant of a deceleration G caused by a decrease in the speed of the vehicle and G caused by an inclination of the vehicle resulting from an inclination of a road surface or the like. Accordingly, even when the vehicle is decelerated at the same rate, the G sensor output SG may vary as the inclination of a road surface varies. For example, in the case of the uphill road shown in FIG. 16, the G sensor output SG becomes smaller because of G (Gb) acting upon the vehicle in the backward direction (on the acceleration side) due to the effect of gravity.

In contrast to this, since the reference G is a reduction rate of the vehicle speed detected by the vehicle speed sensor 61, the effect of the inclination of the road surface can be substantially neglected and thus the reference G can be thought to generally represent only the deceleration G.

Accordingly, calculating the difference between the G sensor output SG and the reference G would make it possible to cancel out the effect of the deceleration G on the G sensor output SG and thus extract G caused by the inclination of the road surface.

The value (the difference G (Gd)) obtained by subtracting the G sensor output SG from the post-LPF reference G (Grf) has an absolute value that is substantially equal to and opposite in sign to G produced due to the effect of gravity in the longitudinal direction of the vehicle. G is positive (G is on the acceleration side) on an uphill and negative (G is on the deceleration side) on a downhill, being generally 0 on a flat road. Thus, it is possible to determine the inclination of a road surface based on this fact.

<Step S312: Delivery of Uphill Determination>

The ECU 41 outputs an uphill determination indicating that the road surface on which the vehicle is stopped is an uphill road having an inclination greater than a predetermined one, the uphill road requiring a greater braking force of the electric parking brake than usual. The ECU 41 then returns to the main routine.

<Step S313: Delivery of Flat Surface Determination>

The ECU 41 outputs a flat surface determination indicating that the road surface on which the vehicle is stopped is substantially flat, and then returns to the main routine.

<Step S314: Delivery of Downhill Determination>

The ECU 41 outputs a downhill determination indicating that the road surface on which the vehicle is stopped is a downhill road having an inclination greater than a predetermined one, the downhill road requiring a greater braking force of the electric parking brake than usual. The ECU 41 then returns to the main routine.

<Inclination Determination Subroutine in High G Region>

<Step S321: Determination of Difference G>

The ECU 41 calculates the difference G (Gd) by subtracting the G sensor output SG from the post-LPF reference G (Grf).

Then, if Gd ? Ch, the ECU 41 proceeds to Step S22. If −2C+Ch<Gd<Ch, then the ECU 41 proceeds to Step S323. If Gd ? −2C+Ch, then the ECU 41 proceeds to Step S324.

Here, Ch is a correction value of a criterion value C in the high G region. For example, Ch is such a predetermined constant that is negative and has its absolute value smaller than the criterion value C.

<Step S322: Delivery of Uphill Determination>

The ECU 41 outputs an uphill determination and then returns to the main routine.

<Step S323: Delivery of Flat Surface Determination>

The ECU 41 outputs a flat surf ace determination and then returns to the main routine.

<Step S324: Delivery of Downhill Determination>

The ECU 41 outputs a downhill determination and then returns to the main routine.

<Backup Inclination Determination Subroutine>

<Step S331: Determination of Flat Surface Determination>

The ECU 41 determines whether a flat surface determination is currently being made. If a flat surface determination is being made, the ECU 41 proceeds to Step S332. Otherwise, the ECU 41 returns to the main routine.

<Step S332: Determination of Activation of Stop Determination Timer>

The ECU 41 determines whether the stop determination timer is working to count up the timer value t as time elapses and the timer value t is greater than or equal to 0. If the timer value t is equal to or greater than 0, the ECU 41 proceeds to Step S33. Otherwise, ECU 41 returns to the main routine.

Here, when the timer value t is other than 0, the stop determination timer is reset (0 is set to t) at the point in time of input of the vehicle body speed in the main flow.

<Step S333: Count-Up of Stop Determination Timer>

The ECU 41 adds 1 to the timer value t of the stop determination timer (t+1 is set to t), and then proceeds to Step S334.

<Step S334: Determination of Timer Value>

The ECU 41 compares the timer value t of the stop determination timer with a pre-set stop determination value (stop judgment value). If the timer value t is equal to the stop determination value, the ECU 41 proceeds to Step S335, or otherwise, returns to the main routine. The stop determination value is defined in consideration of a time that allows an inclination determination to be made based only on an output of the G sensor 43 when the output has been stabilized after the vehicle is stopped.

<Step S335: Acquiring of G Sensor Output SG>

The ECU 41 acquires the output SG of the G sensor 43, and then proceeds to Step S36.

<Step S336: Determination of G Sensor Output>

The ECU 41 compares the G sensor output SG acquired in Step S335 with a pre-set determination G and a determination G having a reversed polarity (−Gj). The determination G (Gj) is a threshold value for determining according to the output of the G sensor output SG whether the vehicle is stopped on such a declining or inclining road that requires the parking brake.

Then, if the G sensor output SG is less than −Gj, the ECU 41 proceeds to Step S337. If the G sensor output SG is greater than Gj, the ECU 41 proceeds to Step S339, or otherwise, proceeds to Step S338.

Note that Step S336 is a stop inclination determination step for determining an inclination irrespective of the reference G during as top of the vehicle. Step S336 also serves as the backup inclination determination step to determine the inclination again irrespective of the reference G when the reference G and the G sensor output are compared with each other to make a flat surface determination.

<Step S337: Delivery of Uphill Determination>

The ECU 41 outputs an uphill determination and then proceeds to Step S340.

<Step S338: Delivery of Flat Surface Determination>

The ECU 41 outputs a flat surface determination and then proceeds to Step S340.

<Step S339: Delivery of Downhill Determination>

The ECU 41 outputs a downhill determination and then proceeds to Step S340.

<Step S340: Stopping of Stop Determination Timer>

The ECU 41 sets −1 to the timer value t of the stop determination timer (−1 is set to t). Then, the ECU 41 stops the stop determination timer and returns to the main routine.

Then, when the uphill determination or downhill determination is outputted in the aforementioned series of stop determination processing steps, the controller 40 provides additional pull control to make the braking force of the parking brake 10 greater than the normal braking force for the vehicle being parked on a flat surface.

As described above, this embodiment can provide the following effects.

(1) The reference G or a reduction rate of the vehicle speed detected by the vehicle speed sensor 61 is compared with the output of the G sensor 43, thereby allowing for canceling out a component of the G sensor output SG resulting from a deceleration and extracting a component caused by an inclination of the road surface. This makes it possible to determine an inclination of the road surface even when the vehicle is being decelerated or immediately after the vehicle is stopped. This allows for setting the braking force of the electric parking brake at an early stage, and thus preventing unintentional movement of the vehicle even when the vehicle operator has released the brake pedal immediately after the vehicle is stopped.

(2) When the vehicle is at a standstill, a determination of an inclination can be made only based on the output of the G sensor 43, thereby ensuring the accuracy of the determination during the stop of the vehicle.

(3) When the reference G and the G sensor output SG are compared with each other to make a flat surface determination, the inclination can be determined again based only on the G sensor output SG. This makes it possible to reduce the possibility of making an erroneous determination that the inclination is determined to be smaller than the actual inclination, and thus provide an improved fail-safe property.

(4) The difference G or a difference between the reference G and the G sensor output SG can be obtained and compared with predetermined criterion values C and Ch, thereby ensuring that a determination of an inclination can be made with a simple logic.

(5) The threshold value used for a determination can be changed according to the magnitude of the reference G. For example, a sudden deceleration may lead to an increase in the amount of nosedive thereby causing the G sensor 43 to have a different output tendency. Even in this case, it is possible to compensate for the effects and provide a proper determination of an inclination.

MODIFIED EXAMPLE

It is to be understood that various modifications and variations can be made to the present invention without being limited to the aforementioned embodiment, and those modifications and variations fall within the scope of the present invention.

(1) The inclination determination apparatus of the present invention is applicable not only to an inclination determination for the electric parking brake but also to any other applications which require a determination of an inclination of a road surface on which a vehicle is stopped.

(2) The embodiment compares the difference between the reduction rate of the vehicle speed and the G sensor output with a criterion value to determine an inclination; however, the present invention is not limited thereto. The invention may also be adapted to quantitatively determine an inclination according to the magnitude of the difference between the reduction rate of the vehicle speed and the G sensor output. Furthermore, a plurality of criterion values may also be defined to determine an inclination in stages.

(3) The embodiment is adapted to select two types of criterion values according to the reduction rate of the vehicle speed; however the present invention is not limited thereto. The invention may also be adapted to select three or more types of criterion values according to the reduction rate of the vehicle speed or organize a map that allows a criterion value to be read according to the reduction rate of the vehicle speed.

While there has been described what are at present considered to be preferred embodiments of the present invention, it will be understood that various modifications may be made thereto, and it is intended that the appended claims cover all such modifications as fall within the true spirit and scope of the present invention.

What is claimed is:

1. A vehicle stop determination apparatus for determining whether a vehicle is at a standstill, comprising:
a vehicle speed sensor for detecting a speed of the vehicle;
a G sensor for detecting a longitudinal acceleration of the vehicle;
an inclination acceleration estimate section for calculating an estimated inclination acceleration resulting from an inclination of a road surface based on a vehicle speed reduction rate calculated from an output of the vehicle speed sensor and an output from the G sensor; and
a stop determination section which includes a first stop determination mode and a second stop determination mode and which selects either one of the first stop determination mode or the second stop determination mode based on the vehicle speed reduction rate calculated before the output of the vehicle speed sensor falls below a detection limit,
wherein in the first stop determination mode, a stop of the vehicle is determined based on a change in the output of the G sensor when the output of the vehicle speed sensor is equal to or less than the detection limit, and in the second stop determination mode, the stop of the vehicle is determined based on a comparison between the output of the G sensor and the estimated inclination acceleration.

2. The vehicle stop determination apparatus according to claim 1, wherein, in the first stop determination mode, the determination of a stop is made based on a change in the output of the G sensor from a decelerating side to an accelerating side.

3. The vehicle stop determination apparatus according to claim 1, wherein, in the first stop determination mode, the determination of a stop is made according to a convergence in variations in the output of the G sensor.

4. The vehicle stop determination apparatus according to claim 3, wherein, in the first stop determination mode, the determination of a stop is established when variations in the output of the G sensor are equal to or less than a pre-defined threshold value over a predetermined period of time.

5. The vehicle stop determination apparatus according to claim 1, further comprising an estimated stop time computation section for calculating an estimated stop time based on the detection limit and the vehicle speed reduction rate when the output of the vehicle speed sensor is equal to or less than the detection limit,
wherein the stop determination section further includes a third stop determination mode in which a stop of the vehicle is determined after the estimated stop time elapses.

6. The vehicle stop determination apparatus according to claim 1, wherein the stop determination section further includes a fourth stop determination mode in which a stop of the vehicle is automatically determined regardless of the stop determination determined by the first step determination mode and the second step determination mode when the output of the vehicle speed sensor is equal to or less than the detection limit over a predetermined stand-by time period.

7. An electric parking brake controller, comprising:
the vehicle stop determination apparatus according to claim 1; and
an electric parking brake control section for controlling an electric actuator to change a braking force of a parking brake and thereby switch the electric actuator between a braking state and a released state of the parking brake,
wherein, when the vehicle stop determination apparatus establishes a determination of a stop of the vehicle, the electric parking brake control section allows the parking brake to transition into the braking state.

8. An inclination determination apparatus for determining an inclination of a road surface on which a vehicle is stopped, the inclination determination apparatus comprising:
a vehicle speed sensor for detecting a speed of the vehicle;
a G sensor for detecting a longitudinal acceleration of the vehicle;
an inclination determination section for calculating an estimated inclination acceleration resulting from an inclination of a road surface based on a vehicle speed reduction rate calculated from an output of the vehicle speed sensor and an output from the G sensor; and
a stop determination section for determining a stop of the vehicle based on the output of the vehicle speed sensor,
wherein the inclination determination section determines the inclination to be a flat surface if the estimated inclination acceleration is below a predetermined criterion value, and re-determines the inclination based on the output of the G sensor when the stop determination section establishes a determination of a stop of the vehicle, and wherein the predetermined criterion value is changed according to the vehicle speed reduction rate.

9. An electric parking brake controller, comprising:
the inclination determination apparatus according to claim 8; and
an electric parking brake control section for controlling an electric actuator to change a braking force of a parking brake,
wherein, when the stop determination section establishes a determination of a stop of the vehicle, the electric parking brake control section sets the braking force of the parking brake based on an estimated inclination acceleration calculated by the inclination determination section.

10. An inclination determination apparatus for determining an inclination of a road surface on which a vehicle is stopped, the inclination determination apparatus comprising:
a vehicle speed sensor for detecting a speed of the vehicle;
a G sensor for detecting a longitudinal acceleration of the vehicle;
a first inclination determination section for calculating a first inclination of a road surface based on a vehicle speed reduction rate calculated from an output of the vehicle speed sensor and an output from the G sensor when the vehicle is in a running state;
a stop determination section for determining a stop of the vehicle based on the output of the vehicle speed sensor;
a second inclination determination section for calculating a second inclination of the road surface based on the G sensor when the stop determination section establishes a determination of the stop of the vehicle; and
a vehicle control section for controlling an actuator of the vehicle when the stop determination section establishes the determination of the stop of the vehicle,
wherein an electric parking brake control section controls the actuator based on the first inclination of the road until the second inclination determination section calculates the second inclination of the road.

11. The vehicle stop determination apparatus according to claim 5, wherein the vehicle is determined to be stopped when the first stop determination mode and the third stop determination mode determine a stop, or when the second stop determination mode and the third stop determination mode determine a stop.

12. The vehicle stop determination apparatus according to claim 1, wherein the estimated inclination acceleration is calculated by the following equation:

$$Gc = Grf - SG,$$

where $Gc$ is the estimated inclination acceleration, $Grf$ is a post-LPF reference G calculated by performing a low pass filter process on the vehicle speed reduction rate, and $SG$ is the output of the G sensor.

13. The vehicle stop determination apparatus according to claim 12, wherein the estimated inclination acceleration comprises an average of multiple values of the estimated inclination acceleration taken over a period of time.

* * * * *